(12) United States Patent
Nakata

(10) Patent No.: US 9,762,806 B2
(45) Date of Patent: Sep. 12, 2017

(54) IMAGING APPARATUS HAVING VARIABLE DIAPHRAGM

(71) Applicant: Olympus Corporation, Hachioji-shi, Tokyo (JP)

(72) Inventor: Koichi Nakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/172,654

(22) Filed: Jun. 3, 2016

(65) Prior Publication Data

US 2016/0366324 A1 Dec. 15, 2016

(30) Foreign Application Priority Data

Jun. 12, 2015 (JP) ................................. 2015-118828

(51) Int. Cl.
*H04N 5/235* (2006.01)
*H04N 5/238* (2006.01)
*G03B 7/097* (2006.01)

(52) U.S. Cl.
CPC ........... *H04N 5/2352* (2013.01); *G03B 7/097* (2013.01); *H04N 5/238* (2013.01); *H04N 5/2351* (2013.01); *H04N 5/2353* (2013.01)

(58) Field of Classification Search
CPC .... H04N 5/2352; H04N 5/2353; H04N 5/238; H04N 5/2351; H04N 5/3532; H04N 5/2254; H04N 5/23219; G03B 7/00; G03B 7/097; G03B 9/02
See application file for complete search history.

(56) References Cited

U.S. PATENT DOCUMENTS

| 5,604,560 | A * | 2/1997 | Kaneda | G03B 17/14 348/E5.044 |
| 7,586,692 | B2 * | 9/2009 | Sugita | G03B 9/02 359/694 |
| 7,675,568 | B2 * | 3/2010 | Uchiyama | G03B 7/00 348/362 |
| 8,032,019 | B2 * | 10/2011 | Shibuno | G03B 7/093 348/362 |
| 8,107,002 | B2 * | 1/2012 | Kato | H04N 5/23245 348/362 |
| 8,253,850 | B2 * | 8/2012 | Murakami | G03B 7/00 348/364 |
| 8,295,697 | B2 * | 10/2012 | Kudo | G03B 7/097 396/242 |
| 8,896,728 | B2 * | 11/2014 | Fujii | G03B 7/093 348/241 |

(Continued)

FOREIGN PATENT DOCUMENTS

JP 2010-002900 1/2010
JP 2013-031010 2/2013

*Primary Examiner* — Michael Osinski
(74) *Attorney, Agent, or Firm* — John C. Pokotylo; Straub & Pokotylo

(57) ABSTRACT

In an imaging apparatus that includes a lens unit and a body unit, when a diaphragm value of a variable diaphragm is changed, the lens unit calculates an announcement value indicating the diaphragm value when a prescribed time period has passed since a detection time of a current diaphragm value of the variable diaphragm, and transmits the announcement value to the body unit, and the body unit controls exposure of an image sensor on the basis of the announcement value obtained from the lens unit.

8 Claims, 18 Drawing Sheets

(56) References Cited

U.S. PATENT DOCUMENTS

| | | | |
|---|---|---|---|
| 8,947,586 B2* | 2/2015 | Yamada | H04N 5/238 |
| | | | 348/363 |
| 9,459,429 B2* | 10/2016 | Asano | G02B 7/20 |
| 2008/0252768 A1* | 10/2008 | Suzuki | H04N 5/2254 |
| | | | 348/312 |
| 2009/0185070 A1* | 7/2009 | Murakami | G03B 7/00 |
| | | | 348/363 |
| 2009/0256954 A1* | 10/2009 | Kranz | H04N 5/238 |
| | | | 348/363 |
| 2009/0290862 A1 | 11/2009 | Shibuno | |
| 2010/0020198 A1* | 1/2010 | Okamoto | H04N 5/23212 |
| | | | 348/231.99 |
| 2011/0122287 A1* | 5/2011 | Kunishige | H04N 1/00114 |
| | | | 348/229.1 |
| 2011/0311212 A1 | 12/2011 | Shibuno | |
| 2014/0240585 A1* | 8/2014 | Takahara | G02B 7/34 |
| | | | 348/345 |
| 2015/0156387 A1* | 6/2015 | Miyakoshi | H04N 5/35536 |
| | | | 348/367 |
| 2016/0105595 A1* | 4/2016 | Huang | H04N 5/238 |
| | | | 348/363 |
| 2016/0227091 A1* | 8/2016 | Miura | H04N 5/2353 |
| 2016/0286109 A1* | 9/2016 | Noda | H04N 5/238 |
| 2016/0366320 A1* | 12/2016 | Taguchi | H04N 5/238 |
| 2017/0054921 A1* | 2/2017 | Lu | H04N 5/2621 |

* cited by examiner

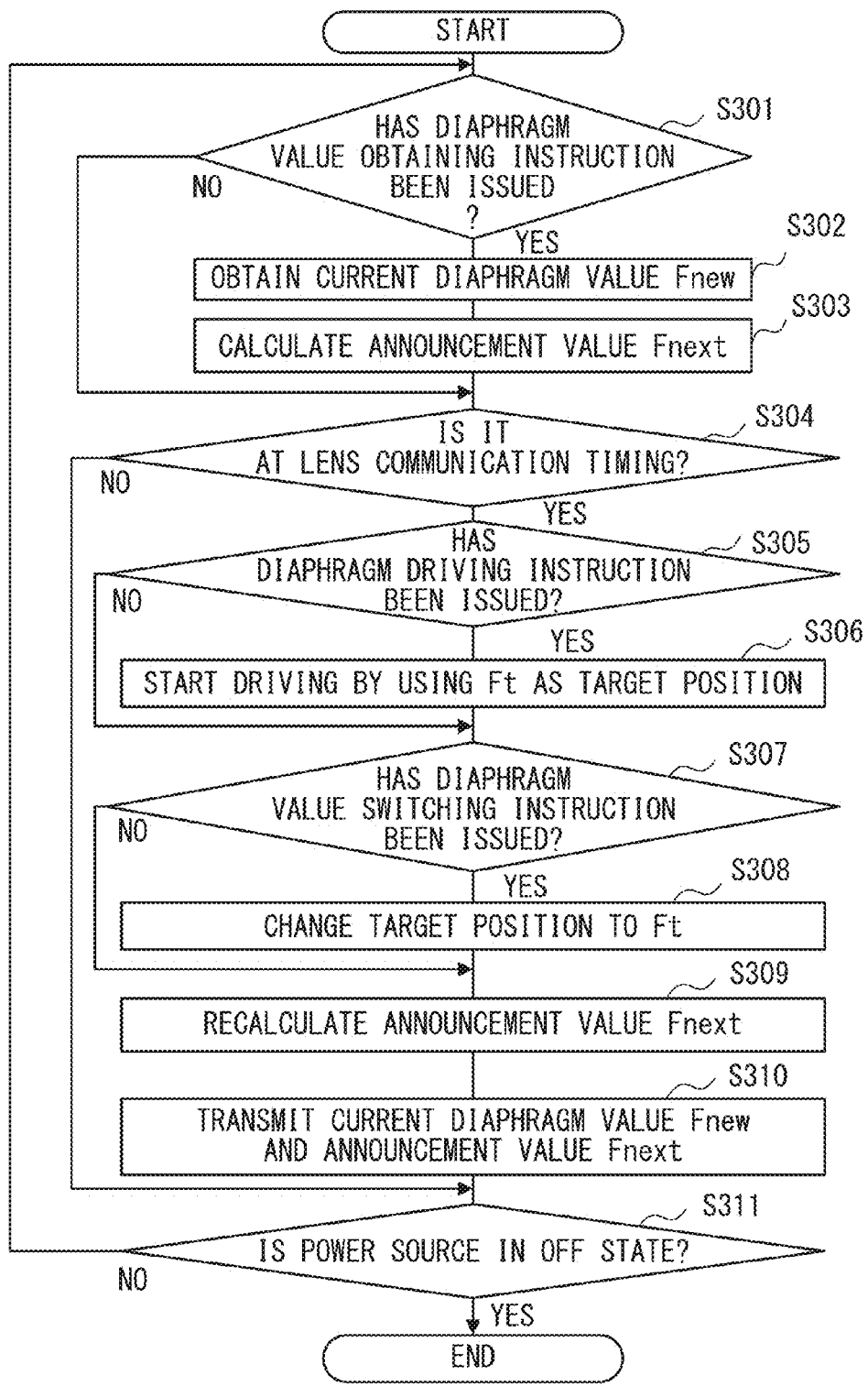
F I G. 7

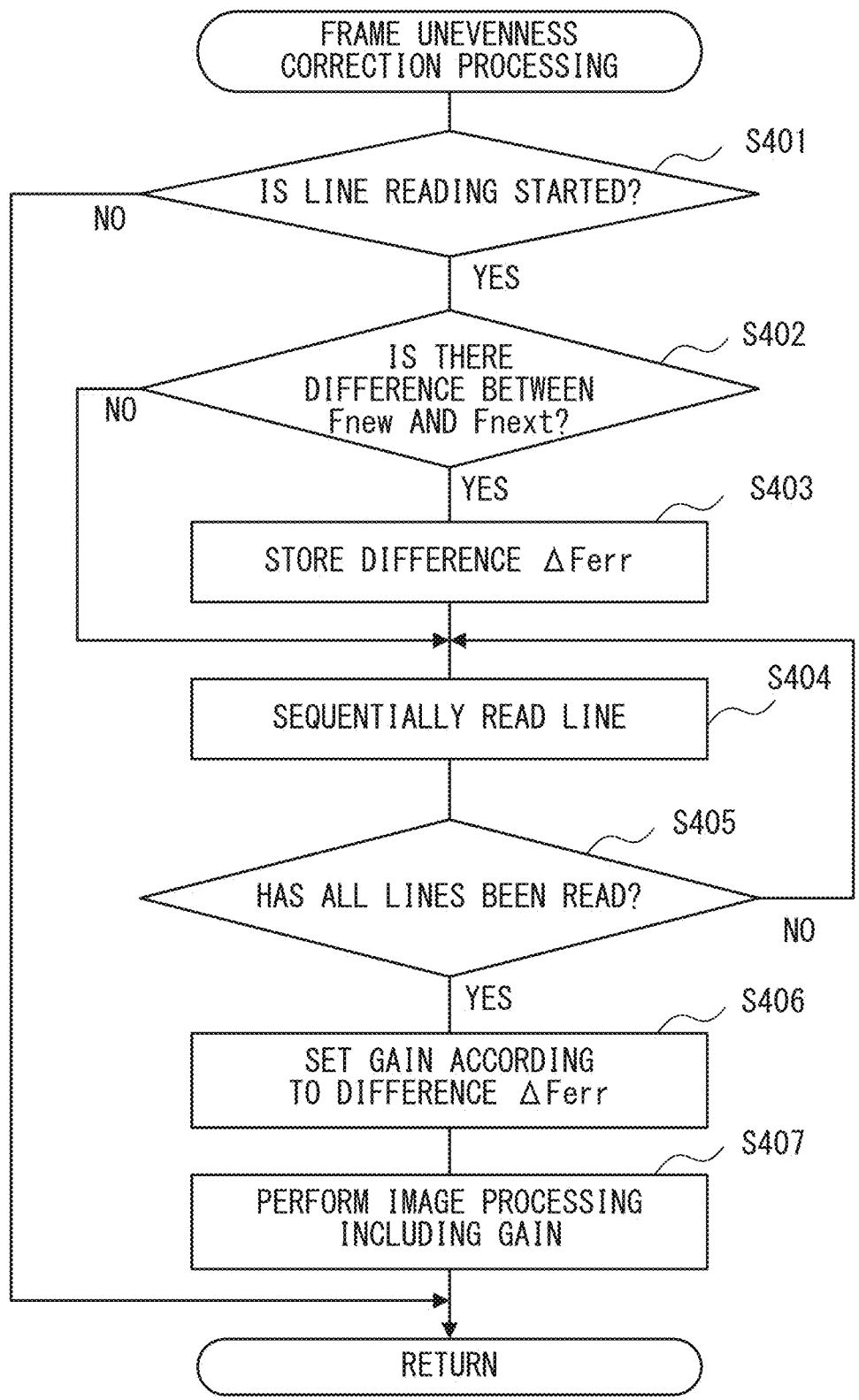
F I G. 8

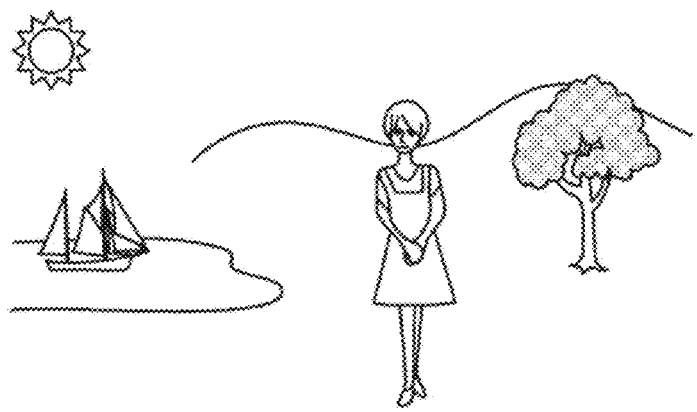
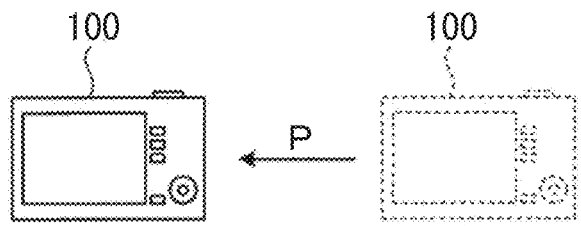
F I G. 15

IMAGING APPARATUS HAVING VARIABLE DIAPHRAGM

CROSS-REFERENCE TO RELATED APPLICATIONS

This application is based upon and claims the benefit of priority of the prior Japanese Patent Application No. 2015-118828, filed on Jun. 12, 2015, the entire contents of which are incorporated herein by reference.

BACKGROUND OF THE INVENTION

Field of the Invention

The present invention relates to an imaging apparatus that images a subject so as to generate electronic image data.

Description of the Related Art

In recent years, photographing that is appropriate to each of the various photographic scenes has been able to be performed by using an imaging apparatus such as a digital camera or a digital video camera. As an example, a technology is known for performing AE (Automatic Exposure) processing for automatically switching exposure according to a diaphragm value even when the diaphragm value is changed in the middle of moving image photographing (Patent Document 1). In this technology, AE processing is smoothly performed by changing an exposure time of an image sensor that generates image data in the middle of a period from the start to the end of the driving of a diaphragm on the basis of information relating to a driving speed of the diaphragm that has been received from an interchangeable lens.

FIG. 15 is a schematic diagram illustrating a situation in which a moving image is photographed by using a conventional imaging apparatus. Under the situation illustrated in FIG. 15, when a photographer performs a panning operation (in a direction of an arrow P) from a dark visual field area to a bright visual field area by using an imaging apparatus, a moving image may be unnaturally displayed due to a problem of exposure adjustment of a camera.

As an example, as illustrated in FIG. 16, luminance may change in the middle of the panning operation, and a flicker may be generated on a screen. Specifically, $W_{n+1}$ and $W_{n+2}$ in FIG. 16 illustrates screens in a case where prediction is performed in a direction in which a camera closes a diaphragm because a subject becomes bright as a result of the panning operation, but, as an example, when a change in a diaphragm value of an interchangeable lens is mechanically greater than a predicted change, the diaphragm is excessively closed such that underexposure occurs.

In recent years, imaging apparatuses installed with a CMOS (Complementary Metal Oxide Semiconductor) sensor have been popular. In the CMOS sensor, rolling shutter reading is performed, and therefore there is a problem caused by a rolling shutter scheme. In the rolling shutter scheme, an exposure timing on the first read line is different from that on the last read line. Therefore, when a diaphragm changes during exposure, a stored amount of light varies according to a vertical direction of a line, and this results in unevenness of brightness (a rolling shutter effect) in a vertical direction of a screen.

FIG. 17 is a diagram explaining an example in which a screen that has unevenness of luminance in a vertical direction is displayed in the rolling shutter scheme. As illustrated in $W_{n+1}$ and $W_{n+2}$ in FIG. 17, due to the rolling shutter effect, unevenness of luminance is generated in a vertical direction of a screen in the middle of a panning operation.

In order to solve the problem above, a technology has been proposed for reducing the unevenness above by obtaining a diaphragm value from an interchangeable lens in time series in a cycle synchronizing with a frame rate of an image sensor during photographing of a moving image, and setting exposure conditions such as an exposure time or ISO sensitivity on the basis of a diaphragm value in subsequent exposure that has been predicted using the time-series data (Patent Document 2).

[Patent Document 1] Japanese Laid-Open Patent Publication No. 2010-2900

[Patent Document 2] Japanese Laid-Open Patent Publication No. 2013-31010

SUMMARY OF THE INVENTION

In order to achieve the object above, an imaging apparatus in a first aspect of the present invention includes: a lens unit that includes an optical system including a variable diaphragm; and a body unit that is configured to be able to be installed with the lens unit and that includes an image sensor that receives light condensed via the lens unit and performs photoelectric conversion. The lens unit includes: a diaphragm driving unit that drives the variable diaphragm; a diaphragm value detecting unit that detects a diaphragm value of the variable diaphragm; and a lens control unit that controls the diaphragm driving unit. When the diaphragm value of the variable diaphragm is changed, the lens control unit calculates an announcement value indicating the diaphragm value when a prescribed time period has passed since a detection time of a current diaphragm value of the variable diaphragm, the current diaphragm value being detected by the diaphragm value detecting unit, and transmits the announcement value to the body unit. The body unit includes an exposure control unit that controls exposure of the image sensor on the basis of the announcement value obtained from the lens unit.

BRIEF DESCRIPTION OF THE DRAWINGS

FIGS. 5A-5G, illustrates a timing chart of exposure time calculation/correction processing according to Embodiment 1.

FIG. 7 is a flowchart explaining a procedure of processing performed by an LCPU according to Embodiment 1.

FIG. 8 is a flowchart explaining a procedure of frame unevenness correction processing according to Embodiment 1.

FIGS. 9A-9G, illustrates Example 1 of specifying a detection timing according to Embodiment 2.

FIGS. 10A-10G, illustrates Example 2 of specifying a detection timing according to Embodiment 2.

FIGS. 11A-11G, illustrates Example 3 of specifying a detection timing according to Embodiment 2.

FIGS. 12A-12G, is a timing chart explaining a procedure of exposure time calculation/correction processing according to Embodiment 3.

FIG. 15 is a schematic diagram illustrating a situation in which a moving image is photographed by using a conventional imaging apparatus.

DETAILED DESCRIPTION OF THE PREFERRED EMBODIMENTS

Embodiments of the present invention are described below with reference to the drawings.

Embodiment 1

Embodiment 1 for implementing the present invention is described below with reference to the drawings. In the description below, a digital single-lens reflex camera is described as an example of an imaging apparatus according to the present invention, but the imaging apparatus is not limited to this.

Figure 1:
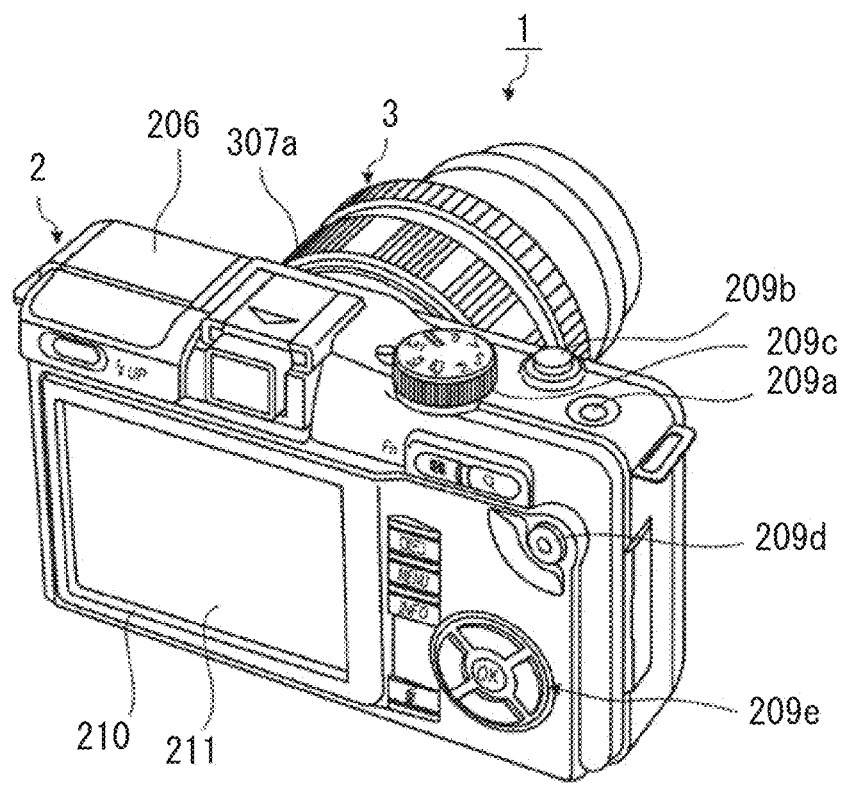
FIG. 1 is a perspective view of an imaging apparatus according to Embodiment 1 viewed from a back side.
Figure 2A:
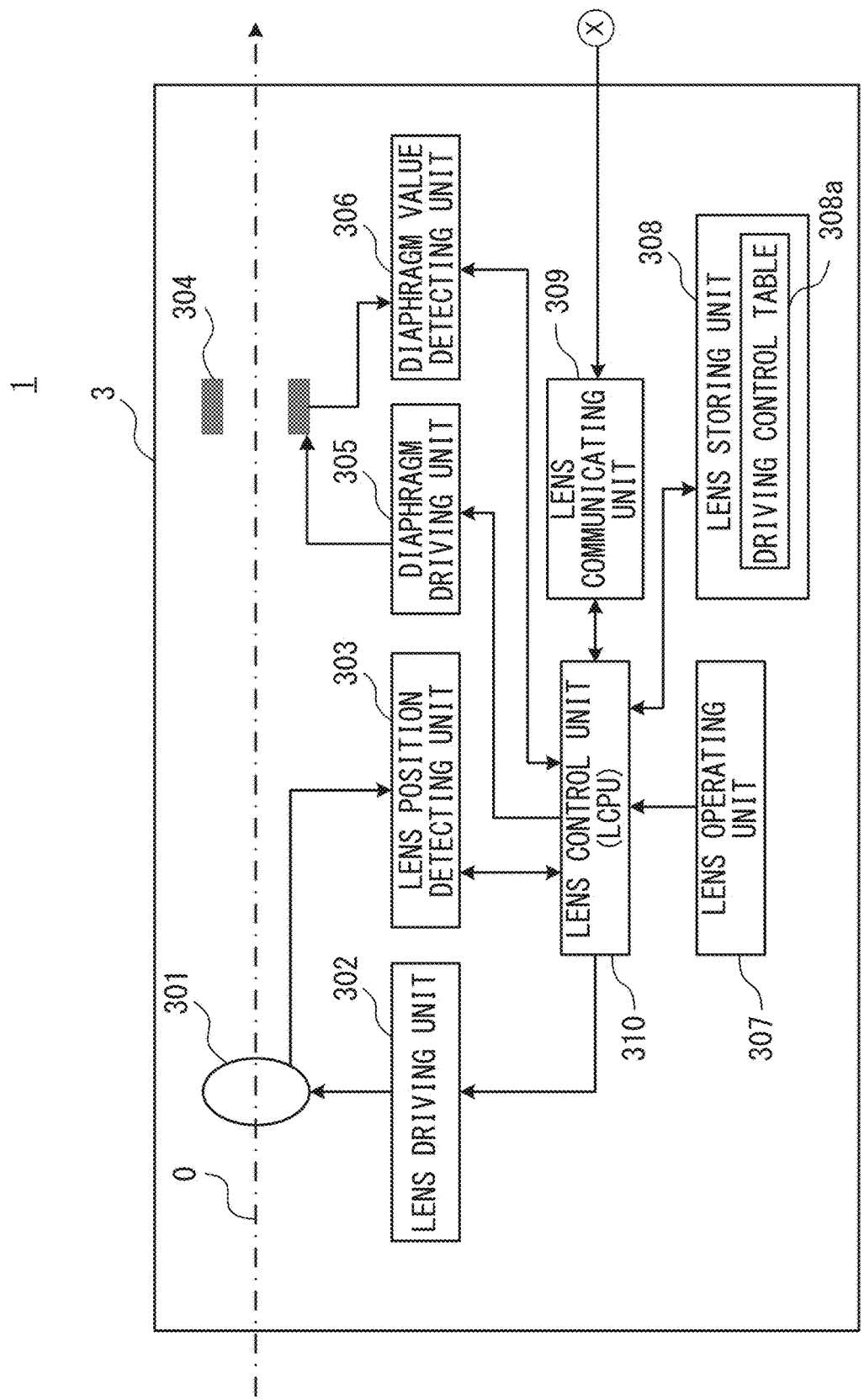
FIG. 2A is a block diagram illustrating a configuration of an imaging apparatus according to Embodiment 1.
Figure 2B:
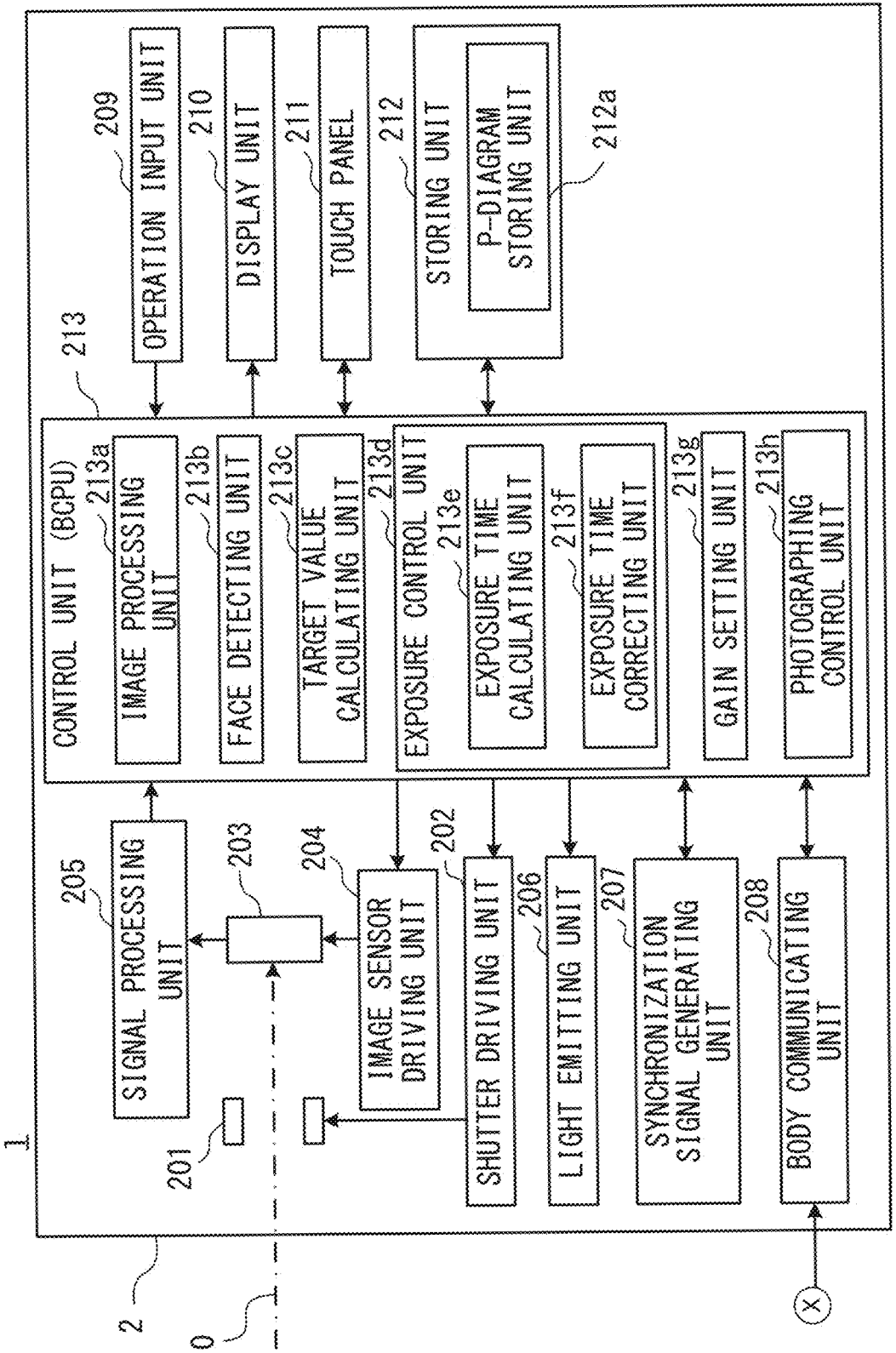
FIG. 2B is a block diagram illustrating a configuration of an imaging apparatus according to Embodiment 1.

FIG. 1 is a perspective view of an imaging apparatus 1 according to Embodiment 1 viewed from a backside. FIG. 2A and FIG. 2B area block diagram illustrating a configuration of the imaging apparatus 1 according to Embodiment 1. The entirety of the imaging apparatus 1 is described with reference to FIGS. 1, 2A and 2B.

As illustrated in FIGS. 1, 2A and 2B, the imaging apparatus 1 includes a body unit 2, and a lens unit 3 that is removable from the body unit 2. The body unit 2 includes a shutter 201, a shutter driving unit 202, an image sensor 203, an image sensor driving unit 204, a signal processing unit 205, a light emitting unit 206, a synchronization signal generating unit 207, a body communicating unit 208, an operation input unit 209, a display unit 210, a touch panel 211, a storing unit 212, and a control unit 213 (hereinafter referred to as a "BCPU 213").

The shutter 201 performs an opening/closing operation principally in photographing of a still image so as to perform an exposure operation for setting the image sensor 203 in an exposure state or a shielding state. The shutter 201 generally maintains in an opening state when a live view image is displayed. The shutter 201 is configured of a focal-plane shutter or the like. The shutter driving unit 202 is configured of a stepping motor or the like, and the shutter driving unit 202 drives the shutter 201 in accordance with an instruction signal input from the BCPU 213.

The image sensor 203 is configured of a CMOS sensor. The image sensor 203 receives light condensed by the lens unit 3, and performs photoelectric conversion so as to continuously generate image data. In the image sensor 203, a plurality of pixels are two-dimensionally arranged that receive light condensed by the lens unit 3, and that perform photoelectric conversion. The image sensor 203 generates image data in a so-called rolling shutter scheme for sequentially reading electric signals converted in the respective pixels on each line in a horizontal direction at different timings.

The image sensor driving unit 204 drives the image sensor 203 at a prescribed timing (for example, 30 fps). Specifically, the image sensor driving unit 204 generates a driving timing signal for synchronously driving the image sensor 203 on the basis of a synchronization signal generated by the synchronization signal generating unit 207, and outputs the generated driving timing signal to the image sensor 203.

The signal processing unit 205 performs signal processing such as amplification on an analog signal output from the image sensor 203, performs A/D conversion so as to generate digital image data (RAW data), and outputs the digital image data to the BCPU 213.

The light emitting unit 206 is configured of a xenon lamp, an LED (Light Emitting Diode), or the like, and the light emitting unit 206 irradiates a visual field area to be photographed by the imaging apparatus 1 with light that is auxiliary light.

The synchronization signal generating unit 207 generates a vertical synchronization signal $V_D$ and a horizontal synchronization signal $H_D$ in accordance with an instruction from the BCPU 213. The synchronization signal generating unit 207 outputs the vertical synchronization signal $V_D$ and the horizontal synchronization signal $H_D$ via the BCPU 213. The synchronization signal generating unit 207 may be integrally provided in the BCPU 213.

The body communicating unit 208 is a communication interface for communication with the lens unit 3 installed onto the body unit 2.

The operation input unit 209 includes a power switch 209a that switches a power state of the imaging apparatus 1 to an ON state or an OFF state, a release switch 209b that inputs a release signal for issuing an instruction to photograph a still image, a photographing mode changeover switch 209c that switches various photographing modes set in the imaging apparatus 1, a moving image switch 209d that issues an instruction to photograph a moving image, and a menu switch 209e that sets various parameters of the imaging apparatus 1, as illustrated in FIG. 1.

The display unit 210 includes a display panel that is made of liquid crystal, organic EL (Electro Luminescence), or the like. On the display unit 210, an image that corresponds to image data, operation information relating to a photographing operation of the imaging apparatus 1, photographing information relating to photographing, or the like is displayed.

The touch panel 211 detects a position in which a photographer performs a touching (contact) operation on the basis of information displayed on the display unit 210, and outputs a signal that corresponds to the detected touch position to the BCPU 213. The touch panel 211 is provided on a display screen of the display unit 210. In general, examples of the touch panel include a resistive film type touch panel, an electrostatic capacitance type touch panel, an optical type touch panel, and the like. In this embodiment, any type of touch panel can be employed.

The storing unit 212 is implemented by using a semiconductor memory, such as a flash memory or a DRAM (Dynamic Random Access Memory), that is fixedly provided within the imaging apparatus 1. The storing unit 212 stores various programs for operating the imaging apparatus 1, and various types of data, parameters, or the like that are used during execution of the various programs. The storing unit 212 stores image data, and also stores information of the lens unit 3 that can be installed onto the body unit 2, correction information of the image data according to the type of the lens unit 3, and the like.

The storing unit 212 includes a P-diagram storing unit 212a. The P-diagram storing unit 212a stores program-diagram (P-diagram) information that is referenced when the imaging apparatus 1 performs automatic exposure (AE) control. The storing unit 212 may include a computer-readable storing medium installed from the outside such as a memory card.

The BCPU 213 is implemented by processing of a CPU (Central Processing Unit) that has read a control program stored in the storing unit 212. The BCPU 213, for example, issues an instruction, or transfers data to respective units that configure the imaging apparatus 1 in accordance with an instruction signal from the operation input unit 209, a position signal from the touch panel 211, or the like, and totally controls the operation of the imaging apparatus 1.

A detailed configuration of the BCPU 213 is described. The BCPU 213 includes an image processing unit 213a, a face detecting unit 213b, a target value calculating unit 213c, an exposure control unit 213d, a gain setting unit 213g, and a photographing control unit 213h.

The image processing unit 213a performs various types of image processing on image data input from the signal processing unit 205, and outputs the processed image data to the storing unit 212. Specifically, the image processing unit 213a performs, on image data, image processing including at least gain processing for adjusting brightness of an image, gradation correction for correcting gradation, edge enhancement, white balance, color correction, and γ-correction. The image processing unit 213a compresses image data according to a JPEG (Joint Photographic Experts Group) scheme.

The face detecting unit 213b detects a person's face included in an image that corresponds to image data by performing pattern matching. The face detecting unit 213b may detect a face of a dog, a cat, or the like, as well as the person's face. Further, the face detecting unit 213b may detect the person's face by using a well-known technology other than pattern matching.

The target value calculating unit 213c calculates a target diaphragm value (also referred to as an aperture diameter or a target value Ft) of a diaphragm of the lens unit 3 on the basis of luminance information of a subject that is included in image data, an exposure time of the image sensor 203, and photographing sensitivity of the image sensor 203.

Specifically, the target value calculating unit 213c calculates a target value AV (a target value Ft) of a diaphragm value according to AV=BV+SV−TV by using subject luminance BV, an exposure time TV, and photographing sensitivity SV according to, for example, an APEX (Additive System of Photographic Exposure) standard.

The exposure control unit 213d controls exposure of the image sensor 203. The exposure control unit 213d includes an exposure time calculating unit 213e and an exposure time correcting unit 213f.

The exposure time calculating unit 213e calculates an exposure time T of the image sensor 203 on the basis of information included in image data and diaphragm information obtained from the lens unit 3. Specifically, the exposure time calculating unit 213e references a P-diagram, and calculates the exposure time T of the image sensor 203 on the basis of luminance information of a subject that is included in image data and photographing sensitivity of the image sensor 203, and a diaphragm value at which a diaphragm of the lens unit 3 is driven at each prescribed timing. The "diaphragm value at which a diaphragm of the lens unit 3 is driven at each prescribed timing" refers, for example, to a diaphragm value ($F_{next}$, hereinafter referred to as an announcement value) of 2 frames after that is obtained from the lens unit 3 immediately before the calculation of an exposure time.

The exposure time correcting unit 213f calculates a temporal change amount ΔF of a diaphragm value from a plurality of diaphragm values at different points in time that have been obtained from the lens unit 3, at the time of driving the diaphragm of the lens unit 3, and corrects the exposure time T of the image sensor 203 on each line N in a horizontal direction.

Specifically, the exposure time correcting unit 213f calculates a temporal change amount ΔF of a diaphragm value of the diaphragm of the lens unit 3 on the basis of, for example, a current diaphragm value $F_{new}$ obtained from the lens unit 3 and a diaphragm value $F_{next}$ (an announcement value) of 2 frames after, and corrects the exposure time T of the image sensor 203 that has been calculated by the exposure time calculating unit 213e on each line N in a horizontal direction.

In other words, the exposure time correcting unit 213f obtains, from the lens unit 3, a diaphragm value at which the diaphragm of the lens unit 3 is driven at each prescribed timing, for example, an announcement value $F_{next}$, and corrects the exposure time T of the image sensor 203 according to the obtained announcement value $F_{next}$ on each of the lines N in the horizontal direction.

The gain setting unit 213g sets a value (a gain value) in gain processing that the image processing unit 213a performs on image data on the basis of a difference between a current diaphragm value $F_{new}$ that has been obtained from the lens unit 3 and an announcement value $F_{next}$ that has been obtained from the lens unit 3 a prescribed number of frames before, for example, 2 frames before.

The photographing control unit 213h performs control to start a photographing operation in the imaging apparatus 1 when a still image release signal is input. The photographing operation in the imaging apparatus 1 refers to an operation in which the signal processing unit 205 and the image processing unit 213a perform prescribed processing on image data that the image sensor 203 outputs when the shutter driving unit 202 and the image sensor driving unit 204 are driven. The processed image data is stored in the storing unit 212 by the photographing control unit 213h.

The body unit 2 having the configuration above may be provided with an electronic view finder (EVF), a sound input/output function, a communication function for performing bidirectional communication with an external personal computer (not illustrated) via the Internet, and the like.

The lens unit 3 includes an optical system 301, a lens driving unit 302, a lens position detecting unit 303, a diaphragm 304, a diaphragm driving unit 305, a diaphragm value detecting unit 306, a lens operating unit 307, a lens storing unit 308, a lens communicating unit 309, and a lens control unit 310 (hereinafter referred to as an "LCPU 310").

The optical system 301 is configured of a plurality of lenses such as a zoom lens that changes an angle of view or a focus lens that adjusts a focus position. The optical system 301 condenses light from a prescribed visual field area, and forms an image of the condensed light on an imaging surface of a CMOS sensor of the image sensor 203. The lens driving unit 302 moves the lenses of the optical system 301 on an optical axis O so as to change a focus position, an angle of view, or the like of the optical system 301. The lens driving unit 302 is configured of a stepping motor, a DC motor, or the like.

The lens position detecting unit 303 is configured of a photo-interrupter or the like, and detects positions of the zoom lens and the focus lens of the optical system 301 that are driven by the lens driving unit 302. Specifically, the lens position detecting unit 303 converts a rotation amount of a driving motor included in the lens driving unit 302 into the number of pulses, and detects the positions of the focus lens and the zoom lens of the optical system 301 from a reference position with infinity as a reference.

The diaphragm 304 controls an incidence amount of the light condensed by the optical system 301 so as to adjust exposure. The diaphragm driving unit 305 drives the diaphragm 304 so as to adjust an amount of light made incident on the image sensor 203. The diaphragm driving unit 305 is configured of a stepping motor or the like.

The diaphragm value detecting unit 306 detects a position of the diaphragm 304 driven by the diaphragm driving unit 305. The diaphragm value detecting unit 306 is configured of a potentiometer such as a linear encoder or a variable resistance element, an A/D conversion circuit, and the like.

The lens operating unit 307 is, for example, a zoom ring 307a provided around a lens barrel of the lens unit 3, as illustrated in FIG. 1, and a signal to operate the lenses in the optical system 301 is input into the lens operating unit 307. The lens operating unit 307 may be a push type switch or the like.

The lens storing unit 308 stores a control program for determining the positions or motions of the optical system 301 and the diaphragm 304. The lens storing unit 308 also stores data such as magnification, a focal length, an angle of view, aberration, or an F value (brightness) of the optical system 301.

Further, the lens storing unit 308 stores driving control table data 308a that is data of a change characteristic of a diaphragm value of the diaphragm 304 according to an amount of driving by the diaphragm driving unit 305. The driving control table data 308a indicates a relationship between a driving amount of a motor for driving a diaphragm and the diaphragm value in the form of a table data, and the driving control table data 308a is used to calculate an announcement value $F_{next}$ by the lens control unit 310, as described later.

The lens communicating unit 309 is a communication interface for performing communication with the body communicating unit 208 of the body unit 2 when the lens unit 3 is installed onto the body unit 2.

The LCPU 310 is implemented by processing of a CPU (Central Processing Unit) that has read a control program stored in the lens storing unit 308. The LCPU 310 controls the operation of the lens unit 3 in accordance with an instruction signal from the BCPU 213 that is transmitted via the body communicating unit 208 and the lens communicating unit 309.

The LCPU 310 transmits a current diaphragm value $F_{new}$ detected by the diaphragm value detecting unit 306 and an announcement value $F_{next}$ of a prescribed number of frames after, for example, 2 frames after, via the lens communicating unit 309 and the body communicating unit 208 to the BCPU 213 in synchronization with a timing at which the image sensor 203 generates image data.

Figure 3:
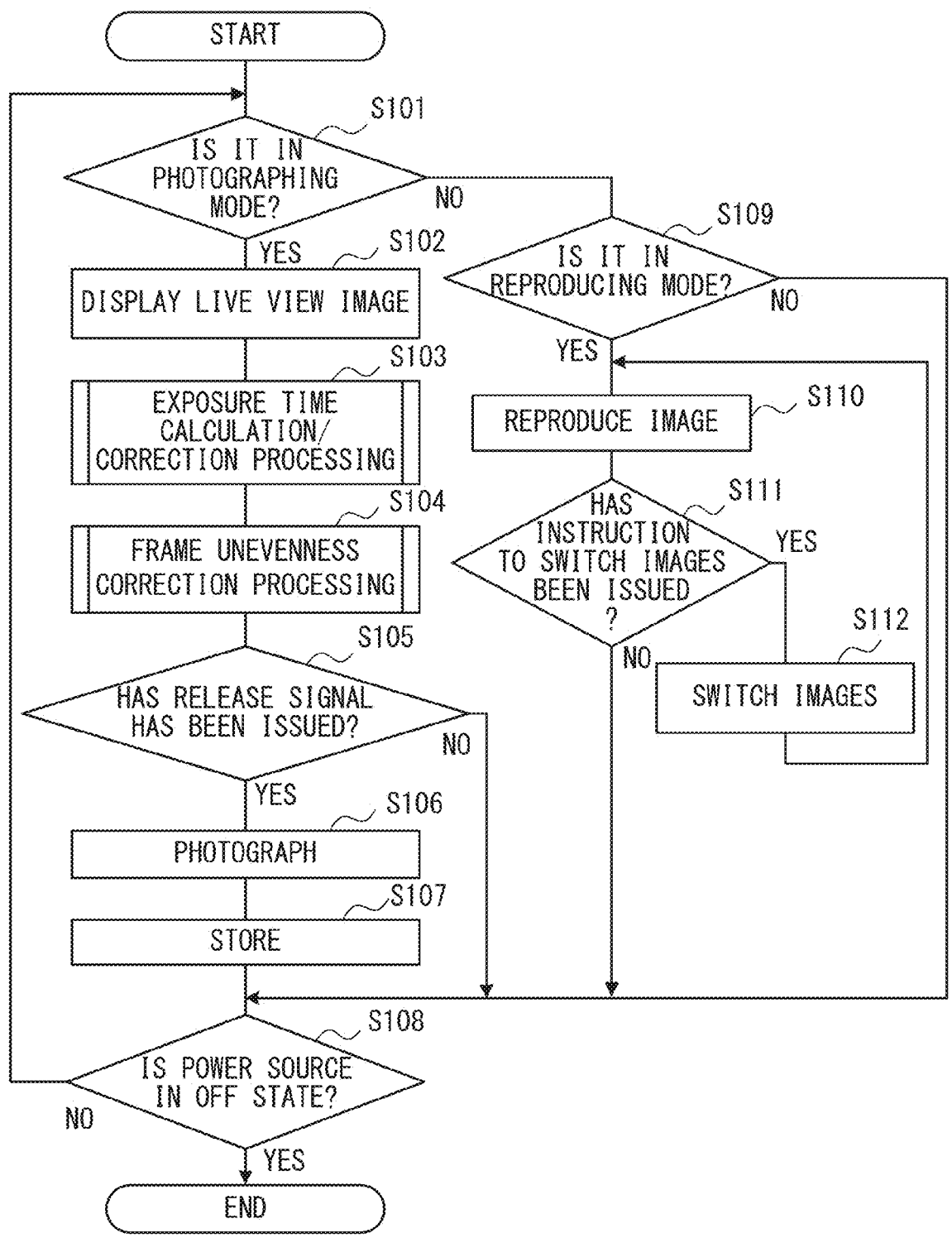
FIG. 3 is a flowchart explaining a procedure of processing performed by an imaging apparatus according to Embodiment 1.

An operation performed by the imaging apparatus 1 having the configuration above is described. FIG. 3 is a flowchart explaining a procedure of processing performed by the imaging apparatus 1 according to Embodiment 1.

The BCPU 213 determines whether the imaging apparatus 1 has been set in a photographing mode (step S101). When the BCPU 213 determines that the imaging apparatus 1 has been set in a photographing mode (step S101; Yes), the BCPU 213 displays a live view image on the display unit 210 (step S102).

Specifically, the BCPU 213 displays live view images that correspond to pieces of image data obtained by the image processing unit 213a performing image processing on pieces of image data that the image sensor 203 continuously generates at a prescribed frame rate, for example, 30 fps, in the order of generation on the display unit 210. A photographer confirms the layout of a subject, or the like by using the live view images displayed on the display unit 210, and performs photographing.

Then, the BCPU 213 performs exposure time calculation/correction processing (step S103). In the exposure time calculation/correction processing, an exposure time of the image sensor 203 is calculated on the basis of an announcement value in each of the frames of image data, and the calculated exposure time is corrected on each of the lines in a horizontal direction of the image sensor 203 on the basis of a temporal change amount of a diaphragm value obtained from the announcement value. Details of the processing are described later with reference to FIG. 4.

Further, the BCPU 213 performs frame unevenness correction processing (step S104). In the frame unevenness correction processing, image data is read from each of the lines of the image sensor 203, and processing of correcting unevenness of brightness of an image is performed on the read image data. Details are described later with reference to FIG. 8.

The BCPU 213 determines whether a release signal has been input from the release switch 209b (step S105). When the BCPU 213 determines that a release signal has been input (step S105; Yes), the BCPU 213 performs photographing (step S106), and stores photographed image data in the storing unit 212 (step S107). When the BCPU 213 determines that a release signal has not been input (step S105; No), the processing moves onto step S108.

Then, the BCPU 213 determines whether a power source is in an OFF state (step S108). When the BCPU 213 determines that a power source is in an OFF state (step S108; Yes), this processing is finished. When the BCPU 213 determines that a power source is not in an OFF state (step S108; No), the processing returns to step S101.

Returning now to step S101, when the BCPU 213 determines that the imaging apparatus 1 has not been set in a photographing mode (step S101; No), the BCPU 213 determines whether the imaging apparatus 1 has been set in a reproducing mode (step S109). When the BCPU 213 determines that the imaging apparatus 1 has been set in a reproducing mode (step S109; Yes), the BCPU 213 reads prescribed image data from the storing unit 212, and reproduces and displays the prescribed image data on the display unit 210 (step S110).

The BCPU 213 determines whether switching of images has been performed (step S111). When the BCPU 213 determines that switching of images has been performed (step S111; Yes), the BCPU 213 switches images to be displayed on the display unit 210 (step S112), and the processing returns to step S110.

The BCPU 213 determines that switching of images has not been performed (step S111; No), the processing moves on to step S108. When the BCPU 213 determines that the imaging apparatus 1 has not been set in a reproducing mode (step S109; No), the processing moves on to step S108.

Figure 4:
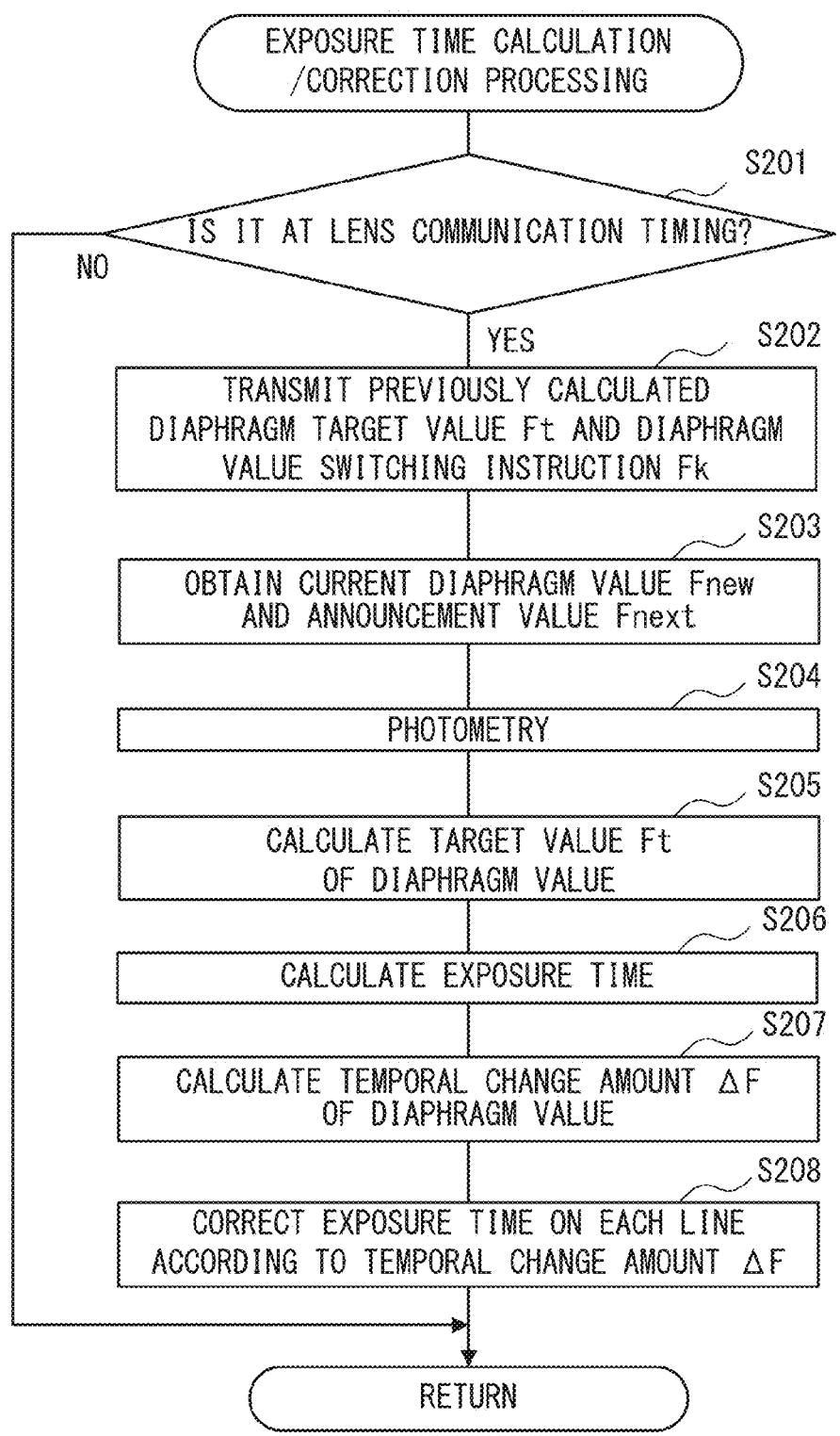
FIG. 4 illustrates a subroutine explaining an outline of exposure time calculation/correction processing according to Embodiment 1.
Figure 5:
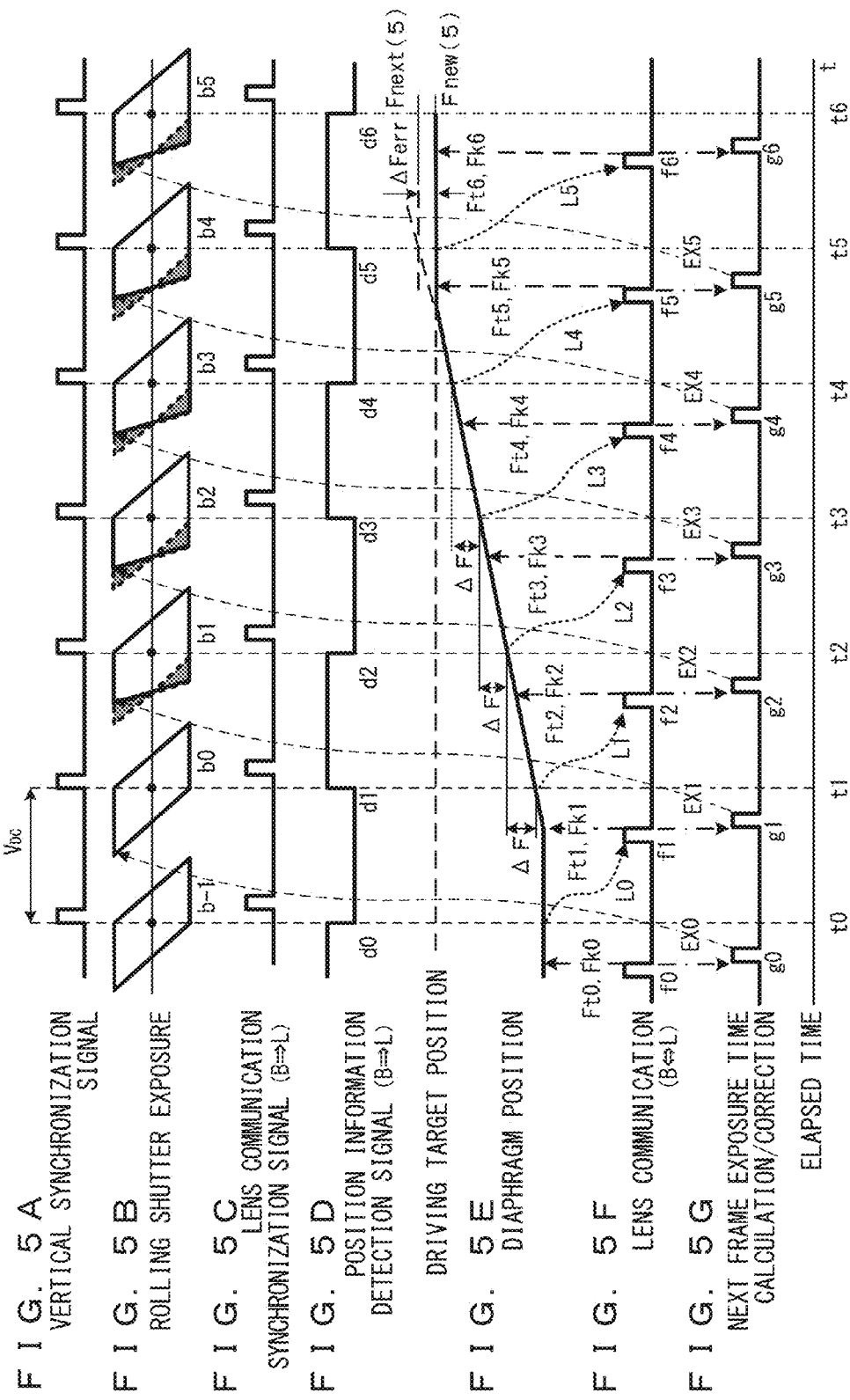
FIG. 5, including

The exposure time calculation/correction processing of step S103 in FIG. 3 is described next. FIG. 4 illustrates a subroutine explaining a procedure of the exposure time calculation/correction processing. FIG. 5, including FIGS. 9A-9G, illustrates a timing chart of the exposure time calculation/correction processing.

FIG. 5A illustrates a timing at which a vertical synchronization signal $V_D$ is generated. FIG. 5B illustrates an exposure timing on each of the lines of a rolling shutter of the image sensor 203, and schematically illustrates deviation of an exposure timing in a vertical direction of a screen. Respective exposure timings are assumed to be b−1, b0, b1, . . . in order from the left.

FIG. 5O illustrates a timing at which a lens communication synchronization signal is generated. The lens communication synchronization signal is a signal to set a timing at which the LCPU 310 communicates with the BCPU 213, and the lens communication synchronization signal is transmitted from the BCPU 213 to the LCPU 310. The LCPU 310 starts lens communication illustrated in FIG. 5F with the BCPU 213 when a prescribed time period has passed since the reception of the lens communication synchronization signal.

FIG. 5D illustrates a communication timing of a position information detection signal. The position information detection signal is a signal to issue from the BCPU 213 to the LCPU 310 an instruction to detect positions of a focus lens and a zoom lens of the optical system 301 by the lens position detecting unit 303 and to detect a diaphragm value of the diaphragm 304 by the diaphragm value detecting unit 306. Respective communication timings of the position information detection signal are assumed to be d0, d1, d2, . . . in order from the left.

FIG. 5E illustrates a change in the diaphragm value of the diaphragm 304. In FIG. 5E, an upward direction is a direction in which a diaphragm diameter decreases, and a downward direction is a direction in which the diaphragm diameter increases. FIG. 5F illustrates a timing of lens communication that is bidirectionally performed by the BCPU 213 and the LCPU 310. Specifically, the BCPU 213 sets a time at which a prescribed time period has passed since the timing of the lens communication synchronization signal of FIG. 5C to be the lens communication timing of FIG. 5F. Respective lens communication timings are assumed to be f0, f1, f2, . . . in order from the left.

FIG. 5G illustrates a timing of next frame exposure time calculation/correction. The next frame exposure time calculation/correction is performed by the exposure time calculating unit 213e and the exposure time correcting unit 213f. Respective timings of the next frame exposure time calculation/correction are assumed to be g0, g1, g2, . . . in order from the left.

In FIG. 5, it is assumed that a cycle of the timing at which the vertical synchronization signal $V_D$ is generated illustrated in FIG. 5A is $V_{DC}$, and that the timing at which the vertical synchronization signal $V_D$ is generated is $t_i=t_0+iV_{DC}$ (i=natural number). The lens communication synchronization signal of FIG. 5C is generated in the same cycle as that of the vertical synchronization signal $V_D$.

The position information detection signal of FIG. 5D rises up or falls down at the generation timing of the vertical synchronization signal $V_D$. The timing of the next frame exposure time calculation/correction of FIG. 5G is a timing immediately after the timing of lens communication. Further, the rolling shutter exposure of FIG. 5B is controlled in such a way that the rising of the generation timing of the vertical synchronization signal $V_D$ matches the center of the exposure timing on a central line of the image sensor 203.

In FIG. 4, the BCPU 213 determines whether it is at the lens communication timing of FIG. 5F at which the BCPU 213 bidirectionally communicates with the LCPU 310 (step S201). When the BCPU 213 determines that it is at the lens communication timing of FIG. 5F after a prescribed time period has passed since the timing of lens communication synchronization signal of FIG. 5C (step S201; Yes), the BCPU 213 transmits a target value Ft of the diaphragm value calculated at a previous timing of photometry or the like (exposure time calculation/correction) and a diaphragm value switching instruction Fk via the body communicating unit 208 and the lens communicating unit 309 to the LCPU 310 (step S202).

The diaphragm value switching instruction Fk is described later with respect to step S307 of FIG. 7. The transmission of the target value Ft of the diaphragm value and the diaphragm value switching instruction Fk is illustrated by a dashed arrow from the lens communication of FIG. 5F to the diaphragm position of FIG. 5E.

The target value Ft of the diaphragm value calculated at a previous photometry timing (exposure time calculation/correction processing) refers to a target value Ft measured/calculated in steps S204 and S205 (described later) in the previous exposure time calculation/correction processing. This is because the exposure time calculation/correction processing in FIG. 4 is repeated, as illustrated in FIG. 3.

When the BCPU 213 determines that it is not at the lens communication timing (step S201; No), the processing of FIG. 4 is finished, and the processing returns to the main routine of FIG. 3.

The BCPU 213 obtains and stores a lens position detected by the LCPU 310, a current diaphragm value $F_{new}$, an announcement value $F_{next}$ and the like as lens information (step S203). As illustrated by an alternating long and short dashed line from the lens communication of FIG. 5F, the lens information obtained at the timing of lens communication is used in the next frame exposure time calculation/correction of FIG. 5G.

Before a current lens communication timing, the LCPU 310, which received the position information detection signal of FIG. 5D from the BCPU 213, has detected the lens position and the current diaphragm value $F_{new}$, has calculated the announcement value $F_{next}$ and has stored them in the lens storing unit 308.

Here, it is assumed that an announcement value $F_{next}$ that is the same as a current diaphragm value $F_{new}$ is transmitted while driving of the diaphragm 304 is stopped and in a state in which an instruction to switch a diaphragm value has not been issued from the BCPU 213. In the state in which an instruction to switch a diaphragm value has not been issued, the announcement value $F_{next}$ may fail to be transmitted.

The BCPU 213 performs photometry on the basis of the image data generated by the image sensor 203 (step S204). Specifically, the BCPU 213 performs photometry for calculating luminance information of a subject in an image (subject information) and a luminance distribution on the basis of image data output via the signal processing unit 205.

The target value calculating unit 213c calculates a target value Ft of a diaphragm value that the diaphragm 304 targets (step S205). Specifically, the target value calculating unit 213c references the P-diagram storing unit 212a, and calculates a target conversion value AV of a diaphragm value that the diaphragm 304 targets on the basis of the subject luminance BV calculated in step S204, and an exposure time TV and photographing sensitivity SV. The target value calculating unit 213c converts the calculated target conversion value AV into an F value in accordance with an APEX conversion table, and calculates the target value Ft of the diaphragm 304.

Processes of steps S201 to S205 are described in detail with reference to FIG. 5. At f1 of the lens communication timing, the BCPU 213 transmits a calculated diaphragm target value Ft (Ft1, Fk1) to the LCPU 310. Similarly, at f1 of the lens communication timing, the LCPU 310 transmits a current diaphragm value $F_{new}$ and an announcement value $F_{next}$ to the BCPU 213. Here, the current diaphragm value $F_{new}$ is data that the LCPU 310 obtains at a timing at which the LCPU 310 receives an instruction of a position information detection signal d0.

The LCPU 310 obtains a target value Ft (Ft0) transmitted from the BCPU 213 at f0 of the lens communication timing just before d0 of the position information detection signal. The target value calculating unit 213c calculates an announcement value $F_{next}$ on the basis of the target value Ft0 and the current diaphragm value $F_{new}$ obtained at a timing d0 of the position information detection signal. The announcement value $F_{next}$ is transmitted from the LCPU 310 at a lens communication timing f1.

At a lens communication timing f1, the current diaphragm value $F_{new}$ and the announcement value $F_{next}$ at d0 of the position information detection signal (L0 in FIG. 5) are transmitted from the LCPU 310 to the BCPU 213.

The target value calculating unit 213c calculates the target value Ft on the basis of luminance information of image data obtained just before. Referring to FIG. 5, the target value calculating unit 213c calculates Ft1 from image data obtained as a result of exposure at b-1.

Then, the exposure time calculating unit 213g calculates an exposure time T of a next frame of the image data generated by the image sensor 203 (step S206). Specifically, the exposure time calculating unit 213e calculates an APEX conversion value $TV=\log_2(1/T)$ of the exposure time T according to Expression (1) below.

$$TV = BV + SV - AV \quad (1)$$

In this expression, BV, SV, and AV respectively represent APEX conversion values of luminance information (obtained in photometry of S204), photographing sensitivity, and an announcement value $F_{next}$ (a diaphragm value of 2 frames after). Specifically, Apex conversion value $BV=\log_2(B/NK)$, Apex conversion value $SV=\log_2(ISO \text{ (sensitivity)}/0.32)$, and Apex conversion value $AV=\log_2(FNo^2)$ are established. In Expression (1), BV+SV is constant. The B of the Apex conversion value BV is cd/cm², and N and K are constants. Further, the FNo of the Apex conversion value AV is a lens diaphragm value.

The photographing control unit 213g uses the exposure time T(TV) calculated above as an exposure time of a next fame. The next frame refers to a frame that corresponds 2 frames after an announcement value $F_{next}$.

The exposure time correcting unit 213f calculates a temporal change amount ΔF of a diaphragm value F (step S207). Specifically, the exposure time correcting unit 213f calculates a temporal change amount ΔF of a diaphragm value in each cycle $V_{DC}$ of the vertical synchronization signal according to Expression (2) below by using a difference $ΔF_{2f}$ between the current diaphragm value $F_{new}$ obtained from the LCPU 310 and the announcement value $F_{next}$.

$$ΔF = ΔF_{2f}/2 \quad (2)$$

Then, the exposure time correcting unit 213f corrects the exposure time of the image sensor 203 on each Of the lines in a horizontal direction according to the temporal change amount ΔF of the diaphragm value of the diaphragm 304 (step S208). In FIG. 5, a relationship between exposure data (EX0, EX1, EX2, . . . ) calculated in the next frame exposure time calculation/correction and corresponding rolling shutter exposure is illustrated with a dashed line. As an example, the exposure control unit 213d controls an exposure time illustrated in b1 of the rolling shutter exposure of FIG. 5 on the basis of exposure data EX1 calculated/corrected at g1. As described above, an exposure time (EX1) in a frame b1 that is an image of 2 frames after is corrected according to data (L0) such as a diaphragm data in the frame b-1.

Figure 6:
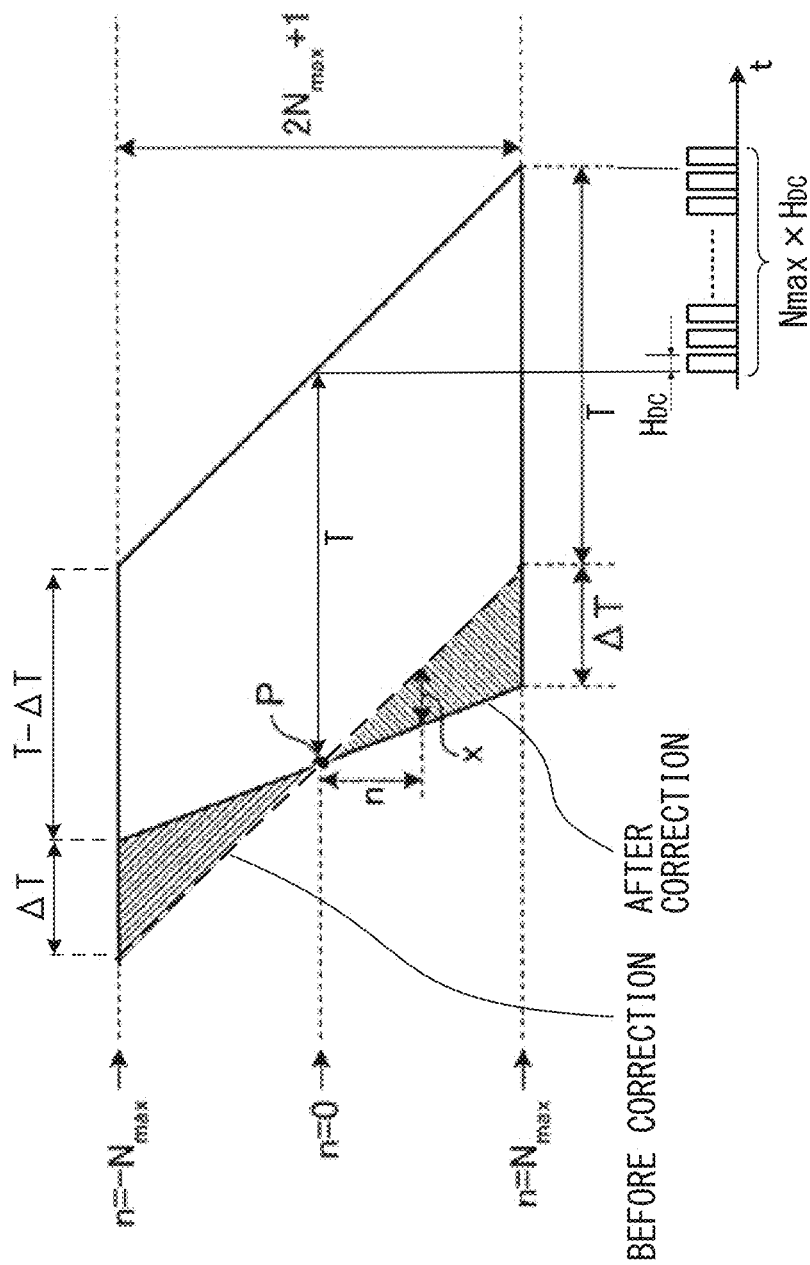
FIG. 6 is a diagram explaining an outline of correcting an exposure time on each line according to Embodiment 1.

FIG. 6 is a diagram explaining an outline when the exposure time correcting unit 213f corrects an exposure time of the image sensor 203 on each line. In FIG. 6, it is assumed that the total number of lines of the image sensor 203 is $2N_{max}+1$ ($N_{max}$=natural number). It is also assumed that an exposure time of a frame that corresponds to one piece of image data calculated by the exposure time calculating unit 213g is T, and that an exposure correction time corrected on the last line $2N_{max}+1$ of the image sensor 203 is ΔT. In FIG. 6, a point P indicates a timing of exposure commencement on a central line (n=0) in the image sensor 203.

In order to offset an amount of a change in an exposure amount due to a change in a diaphragm in a vertical synchronization signal cycle by adjusting an exposure time on each horizontal line of an image sensor, a change rate in a vertical direction of the exposure time on each of the horizontal lines is made to match a change rate of the diaphragm.

A rate of exposure correction time ΔT to the diaphragm change amount ΔF is made to be equal to a rate of a time that corresponds to a change from exposure correction time 0 on a central line to exposure correction time ΔT on the last line, namely, time $N_{max} \times H_{DC}$ of the number of horizontal synchronization signal cycles from the central line to the last line, to a vertical synchronization signal cycle $V_{DC}$ that is a time that corresponds to a change of ΔF.

Accordingly, Expression (3) below is established, where T represents an exposure time of one piece of image data calculated by the exposure time calculating unit 213g, ΔF represents a diaphragm change amount of the diaphragm 304 that corresponds to a cycle of a vertical synchronization signal, $V_{DC}$ represents the cycle of the vertical synchronization signal, $H_{DC}$ represents a cycle of a horizontal synchronization signal, and ΔT represents an exposure correction time corrected on the last line $2N_{max}+1$ of the image sensor 203.

$$ΔT:ΔF = N_{max} \times H_{DC}:V_{DC} \quad (3)$$

From Expression (3), the expression below is established.

$$ΔT = ΔF \times N_{max} \times H_{DC}/V_{DC} \quad (4)$$

Assume that a line of the image sensor 203 on which the exposure time correcting unit 213f corrects an exposure time is n (n=natural number). When the n satisfies a condition of $-N_{max}/2 \leq n \leq N_{max}/2$, and an exposure correction time to be corrected is assumed to be x, Expression (5) below is established from FIG. 6.

$$x:ΔT = n:N_{max} \quad (5)$$

Accordingly, the expression below is established.

$$x = ΔT \times n/N_{max} \quad (6)$$

When Expression (4) is substituted in Expression (6), the expression below is established.

$$x = ΔF \times H_{DC} \times n/V_{DC} \quad (7)$$

As described above, the exposure time correcting unit 213f corrects the exposure time T of the image sensor 203 on each of the lines in a horizontal direction by using the x calculated according to Expression (7) above.

Figure 17:
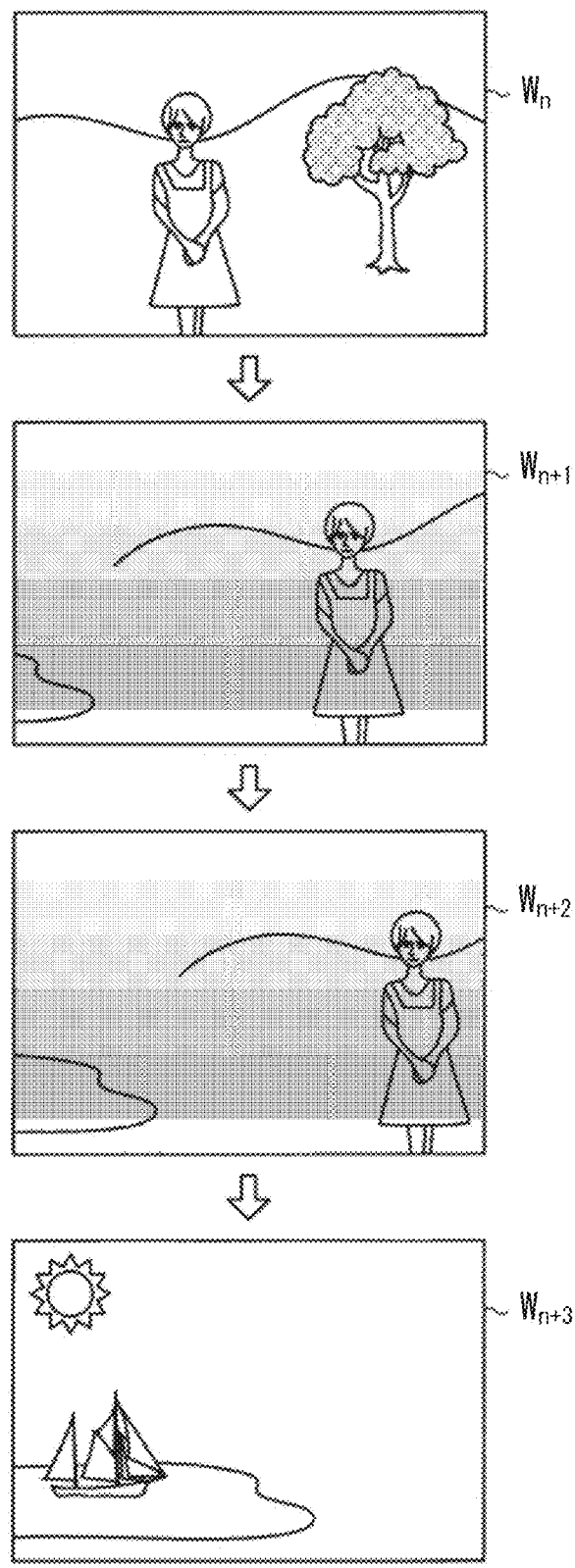
FIG. 17 is a diagram explaining that luminance unevenness is generated in a vertical direction of a screen under the situation of FIG. 15.

As illustrated in FIG. 6, the exposure time correcting unit 213f increments the exposure correction time by x when a line n of the image sensor 203 satisfies n>0, and decrements the exposure correction time by x when the line n of the image sensor 203 satisfies n<0. In a case in which the imaging apparatus 1 is photographing a moving image, or the display unit 210 is displaying a live view image, assume that the exposure time is fixed while the diaphragm 304 is being driven in a direction of a target value. As illustrated in FIG. 17, brightness varies in a vertical direction of a screen.

In the example of FIG. 5, as illustrated in FIG. 5E, the diaphragm 304 changes in a direction in which the diaphragm 304 is closed, and the diaphragm is relatively small on a lower side of the screen, compared with an upper side of the screen. Therefore, when the exposure time on each of the lines is fixed (a dashed oblique line on a left-hand side of FIG. 6), a light receiving amount decreases on the lower side of the screen. Namely, luminance on the lower side of the screen relatively decreases, compared with the upper side of the screen.

Accordingly, in Embodiment 1, the exposure time correcting unit 213f corrects the exposure time T of the image sensor 203 on each of the lines in a horizontal direction at each of the lens communication timings on the basis of a current diaphragm $F_{new}$ and a temporal change amount $\Delta F$ (a solid oblique line on a left-hand side of FIG. 6). By doing this, an amount of light received on each of the lines in the horizontal direction of the image sensor 203 can be made constant. Consequently, exposure unevenness of an image can be suppressed. Following step S208, the processing of the imaging apparatus 1 returns to the main routine of FIG. 3.

Processing performed by the LCPU 310 is described next. FIG. 7 is a flowchart explaining a procedure of the processing performed by the LCPU 310. The LCPU 310 determines whether a diaphragm value obtaining instruction has been issued (step S301). The diaphragm value obtaining instruction is issued by using rising or falling of the position information detection single (FIG. 5D) from the BCPU 213. The LCPU 310 determines that a diaphragm value obtaining instruction has not been issued (step S301; No), the processing moves on to step S304.

The LCPU 310 determines that a diaphragm value obtaining instruction has been issued (step S301; Yes), the LCPU 310 obtains a diaphragm value from the diaphragm value detecting unit 306 (step S302). The LCPU 310 also obtains a lens position from the output of the lens position detecting unit 303 simultaneously with the obtaining of the diaphragm value. Then, the LCPU 310 stores the obtained current diaphragm value $F_{new}$ and lens position in the lens storing unit 308.

The LCPU 310 calculates an announcement value $F_{next}$ (step S303). Specifically, the LCPU 310 calculates the announcement value $F_{next}$ on the basis of the obtained current diaphragm value $F_{new}$ and the driving control table data 308a of the diaphragm 304, and a diaphragm target value Ft. The calculated announcement value $F_{next}$ is stored in the lens storing unit 308.

The LCPU 310 receives the diaphragm target value Ft from the BCPU 213 at a lens communication timing before the diaphragm value obtaining instruction in step S301 (step S306 or S308 described later), and stores the diaphragm target value Ft in the lens storing unit 308. The LCPU 310 uses the stored diaphragm target value Ft in step S303. In the example of FIG. 5, the announcement value $F_{next}$ is calculated on the basis of Ft0 received at f0 of the lens communication and a current diaphragm value $F_{new}$ obtained at d0 of the position information detection signal.

The LCPU 310 determines whether it is at the lens communication timing of FIG. 5F (step S304). Specifically, the LCPU 310 determines whether a prescribed time period has passed since the timing of the lens communication synchronization signal of FIG. 5C. The LCPU 310 determines that it is not at the lens communication timing of FIG. 5F (step S304; No), the processing moves on to step S311.

The LCPU 310 determines that it is at the lens communication timing of FIG. 5F (step S304; Yes), the LCPU 310 performs communication with the BCPU 213 insteps S305 to S309.

The LCPU 310 determines whether the BCPU 213 has issued a diaphragm driving instruction (step S305). The diaphragm driving instruction is an instruction to start driving of the diaphragm 304 when the diaphragm 304 has not been driven. The LCPU 310 determines that a diaphragm driving instruction has been issued (step S305; Yes), the LCPU 310 receives the diaphragm target value Ft transmitted together with the diaphragm driving instruction, and starts to drive the diaphragm to a target position of the diaphragm (step S306) (Ft in the lens communication of FIG. 5F). When the LCPU 310 determines that a diaphragm driving instruction has not been issued (step S305; No), the processing moves on to step S307.

The LCPU 310 determines whether the BCPU 213 has issued a diaphragm value switching instruction (step S307). The diaphragm value switching instruction is an instruction to change a target diaphragm value (a target position) set in a case in which a diaphragm is being driven.

The LCPU 310 determines that a diaphragm value switching instruction has been issued (step S307; Yes), the LCPU 310 receives the diaphragm target value Ft transmitted together with the diaphragm value switching instruction Fk, and changes the target position to a switching position (step S308).

The LCPU 310 recalculates the announcement value $F_{next}$ on the basis of the current diaphragm value $F_{new}$ obtained in step S302, the driving control table data 308a of the diaphragm 304, and the changed diaphragm target value Ft, and stores the announcement value $F_{next}$ in the lens storing unit 308 (step S309). When the LCPU 310 determines that a diaphragm value switching instruction has not been issued (step S307; No), the processing moves on to step S309. When the diaphragm value switching instruction has not been issued, the diaphragm target value Ft is not transmitted either.

The LCPU 310 transmits the current diaphragm value $F_{new}$ obtained in step S302 and the announcement value $F_{next}$ calculated in step S303 or S309 (step S310).

The LCPU 310 determines whether a power source is in an OFF state (step S311). The LCPU 310 performs the determination of step S311 on the basis of whether an instruction to turn off a power source has been issued from the BCPU 213. The LCPU 310 determines that a power source is not in an OFF state (step S311; No), the processing returns to step S301, and the LCPU 310 repeats the processing. When the LCPU 310 determines that an instruction to turn off a power source has been issued (step S311; Yes), this processing is finished.

The frame unevenness correction processing of step S104 in FIG. 3 is described next. FIG. 8 is a flowchart explaining a procedure of the frame unevenness correction processing.

As illustrated in FIG. 8, the BCPU 213 determines whether it is at a start timing of reading a line of the image sensor 203 (step S401). The BCPU 213 determines that it is not at a start timing of reading a line of the image sensor 203 (step S401; No), the processing returns to the main routine of FIG. 3.

When the BCPU 213 determines that it is at a start timing of reading a line of the image sensor 203 (step S401; Yes), the BCPU 213 determines whether a difference $\Delta F_{err}$ exists between a current diaphragm value $F_{new}$ and an announcement value $F_{next}$ obtained from the LCPU 310 2 frames before (step S402). As an example, at t5 of FIG. 5, the BCPU 213 determines that a difference $\Delta F_{err}$ exists between a current diaphragm value $F_{new}$ (5) at time t5 and an announcement value $F_{next}$(5) at time t5.

As an example, when, after the lens unit 3 calculates an announcement value $F_{next}$ of a diaphragm value of 2 frames after, a user performs a zoom operation such that a diaphragm tracking operation for preventing a diaphragm value from changing in accordance with a change in zoom is performed, the difference $\Delta F_{err}$ is generated. As described above, when a diaphragm operation that cannot be predicted at a point in time at which the lens unit 3 calculates an announcement value $F_{next}$ is performed after the calculation of the announcement value $F_{next}$ the difference $\Delta F_{err}$ is generated.

When the BCPU 213 determines that a difference exists between a current diaphragm value $F_{new}$ and an announcement value $F_{next}$ (step S402; Yes), the BCPU 213 stores the difference $\Delta F_{err}$ between the current diaphragm value $F_{new}$ and the announcement value $F_{next}$ of the diaphragm 304 in the storing unit 212 (step S403). As an example, under the situation illustrated in FIG. 15, the BCPU 213 stores a difference $\Delta F_{err}$ between a current diaphragm value $F_{new}$(5) and an announcement value $F_{next}$(5) of the diaphragm 304 at time t5 in the storing unit 212.

When the BCPU 213 determines that a difference does not exist between a current diaphragm value $F_{new}$ and an announcement value $F_{next}$ (step S402; No), the processing moves on to step S404.

The photographing control unit 213g drives the image sensor driving unit 204 so as to sequentially perform reading on each of the lines in a horizontal direction of the image sensor 203 (step S404).

Then, the BCPU 213 determines whether reading has been finished on all of the lines of the image sensor 203 (step S405). When the BCPU 213 determines that reading has not been finished on all of the lines of the image sensor 203 (step S405; No), the processing returns to step S404.

When the BCPU 213 determines that reading has been finished on all of the lines of the image sensor 203 (step S405; Yes), the gain setting unit 213g sets a gain that the image processing unit 213a performs on image data on the basis of the difference $\Delta F_{err}$ between the current diaphragm value $F_{new}$ and the announcement value $F_{next}$ stored in the storing unit 212 (step S406).

The image processing unit 213a performs digital image processing including processing of adjusting a gain on image data read from the image sensor 203 on the basis of the gain set by the gain setting unit 213g (step S407).

As described above, the image processing unit 213a performs processing including the processing of adjusting a gain on image data read from the image sensor 203 on the basis of the gain set by the gain setting unit 213g.

Figure 14:
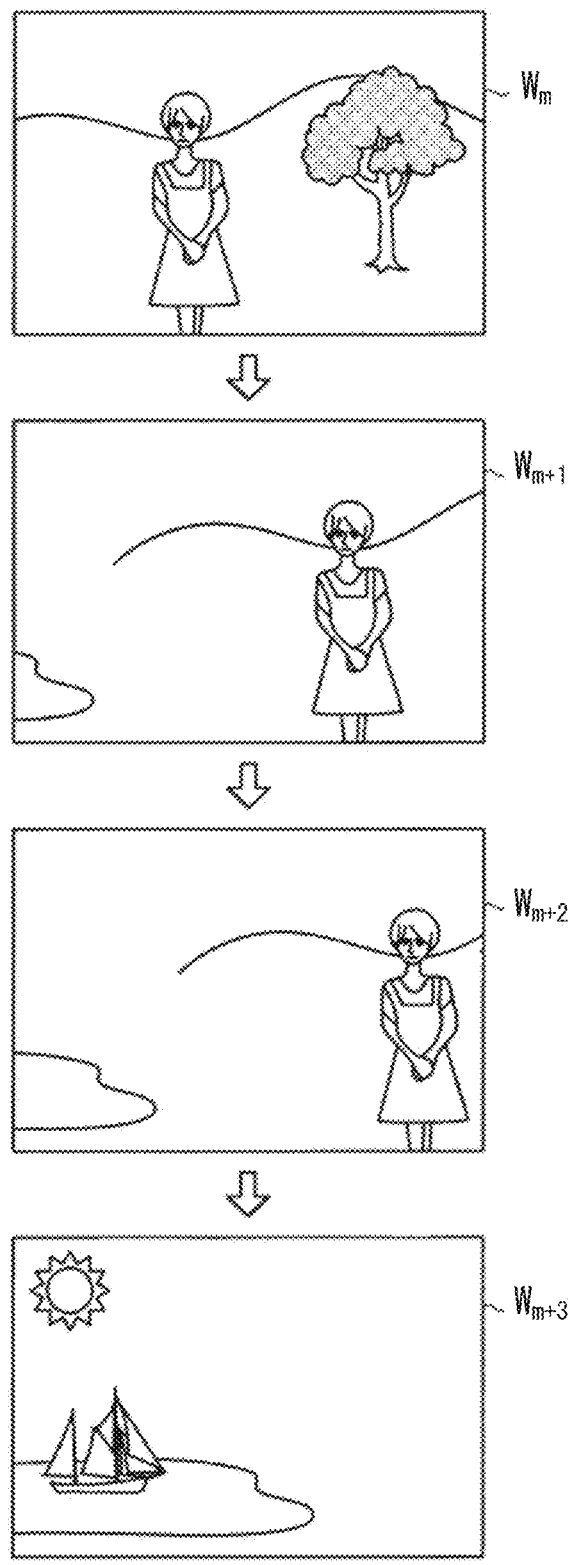
FIG. 14 illustrates a display image when a panning operation is performed in an imaging apparatus according to Embodiment 1.
Figure 16:
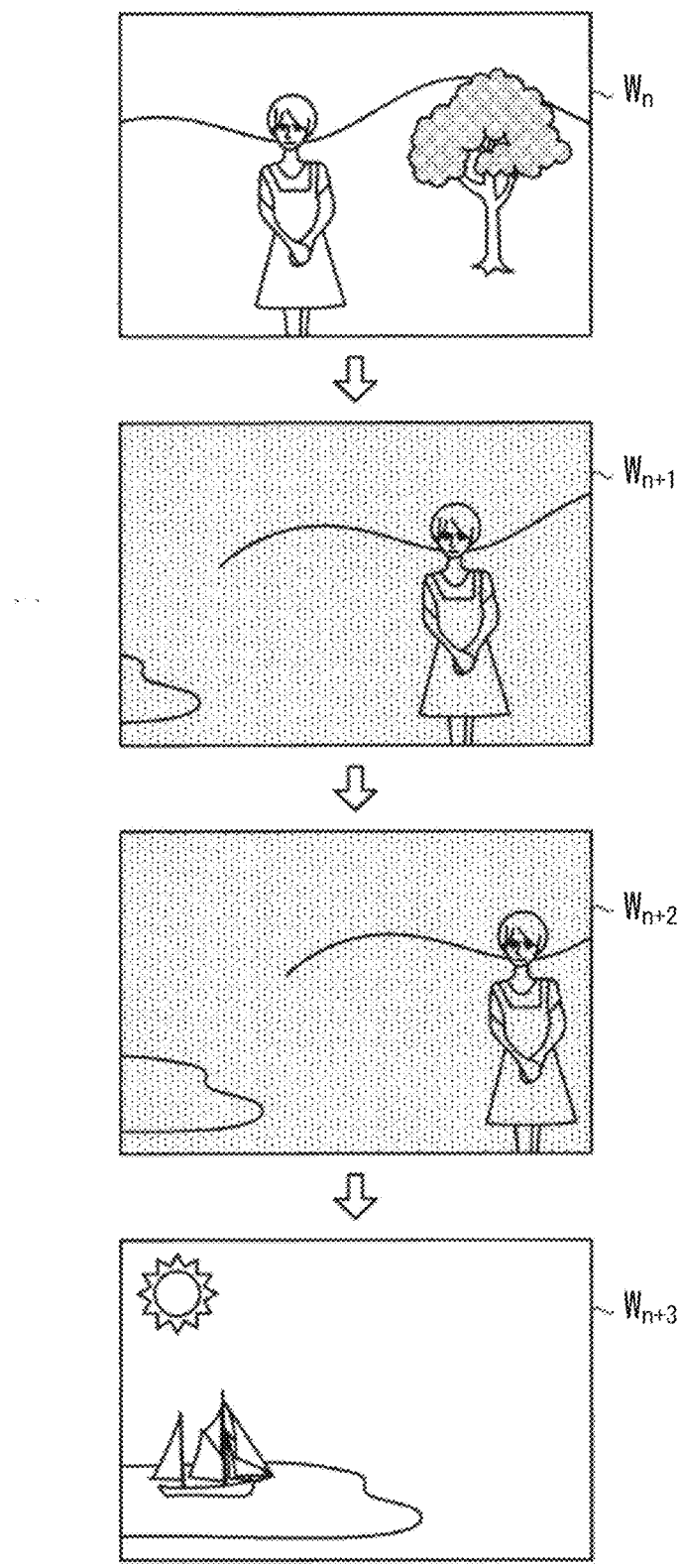
FIG. 16 is a diagram explaining that a flicker is generated on a screen under the situation of FIG. 15.

Consequently, even when a photographer performs a panning operation by using the imaging apparatus 1 such that a visual field area photographed by the imaging apparatus 1 is shifted, for example, from a dark visual field area to a bright visual field area, as illustrated in $W_m$ to $W_{m+3}$ of FIG. 14, the imaging apparatus 1 can photograph a moving image in which brightness of an image is always even, or can display a live view image on the display unit 210 without unevenness of brightness of an image generated between adjacent frames ($W_m \rightarrow W_{m+1} \rightarrow W_{m+2} \rightarrow W_{m+3}$). Following step S407, the processing returns to the main routine of FIG. 3.

According to Embodiment 1 of the present invention described above, when the diaphragm 304 of the lens unit 3 is being driven, the exposure time calculating unit 213g calculates an exposure time on the basis of a diaphragm value $F_{next}$ (an announcement value) of 2 frames after obtained from the lens unit 3. The exposure time correcting unit 213f calculates a temporal change amount $\Delta F$ in one frame from a change ($|F_{new}-F_{next}|$) in a diaphragm value of the diaphragm 304 between 2 frames, and corrects the exposure time on each of the lines in a horizontal direction of the image sensor 203 on the basis of $\Delta F$ and the exposure time calculated by the exposure time calculating unit 213g.

As a result, unevenness of brightness generated on each screen when the image sensor 203 photographs a moving image or displays a live view image, and unevenness of brightness in an image can be suppressed with a high accuracy, compared with a conventional technology.

Further, according to Embodiment 1, the gain setting unit 213g sets a gain that the image processing unit 213a performs on image data on the basis of a difference between an announcement value $F_{next}$ of the diaphragm 304 and a current diaphragm value $F_{new}$ of the diaphragm 304 that have been obtained from the LCPU 310. Stated another way, unevenness of brightness of an image is corrected in two stages, digital image processing performed by the image processing unit 213a and exposure time correction processing performed by the exposure time correcting unit 213f.

Consequently, unevenness of brightness of an image generated between adjacent frames when the image sensor 203 photographs a moving image, or displays a live view image on the display unit 210 can be surely suppressed, compared with a conventional technology.

According to Embodiment 1, a moving image can be photographed, or a live view image can be displayed on the display unit 210 without unevenness of brightness of an image generated in a state in which the diaphragm 304 is being driven at a fixed change rate.

In Embodiment 1, a live view image displayed on the display unit 210 has been described, but the present invention can be applied to photographing of a moving image in which the image sensor 203 continuously generates image data.

Embodiment 1 has been described by using a frame rate of 30 fps of image data generated by the image sensor 203, but the present invention can be applied to any frame rate of 60 fps, 120 fps, and 240 fps, and a frame rate of image data can be appropriately set.

In Embodiment 1, the BCPU 213 obtains a current diaphragm value and a diaphragm value of 2 frames after in lens communication with the LCPU 310, and obtains a temporal change amount $\Delta F$ of a diaphragm value. However, according to the type, the photographing mode, or the like of the lens unit 3 installed onto the body unit 2, one of the two diaphragm values above may be obtained, and the temporal change amount $\Delta F$ of the diaphragm value may be obtained from a temporal change in the one of the two diaphragm values above.

In Embodiment 1, the BCPU 213 obtains a current diaphragm value and a diaphragm value of 2 frames after in lens communication with the LCPU 310, and obtains a temporal change amount ΔF of a diaphragm value. However, obtained diaphragm values are not limited to the current diaphragm value and the diaphragm value of 2 frames after, and a combination of a current diaphragm value and a diaphragm value of 3 frames after may be obtained, for example.

Further, obtained diaphragm values are not limited to a current diaphragm value and a diaphragm value at another timing. As an example, by obtaining a combination of a current diaphragm value and diaphragm values at a plurality of timings other than a current timing such as diaphragm values of 2, 3, and 4 frames after, and confirming in advance a predicted change in a diaphragm value, unevenness of brightness of an image between adjacent frames can be suppressed that is generated, for example, while a live view is being displayed, by misidentifying a change in an exposure amount due to a tracking operation when a zoom operation or the like is performed during the driving of a diaphragm to be subject luminance and by accidentally changing exposure conditions.

Embodiment 2

In Embodiment 2, an example is described in which timings of detecting a lens position and a diaphragm value, which are the same as each other in Embodiment 1, are individually specified. A block diagram of an imaging apparatus or basic flowcharts according to Embodiment 2 are the same as those according to Embodiment 1, and only differences are described below.

In Embodiment 1, upon receipt of the position information detection signal of FIG. 5D, a lens position of a focus lens, a zoom lens, or the like in the optical system 301 and a diaphragm value of the diaphragm 304 are detected at a common timing. In this case, when an AF area and an AE area are specified in different positions in a spot AE or a spot AF, a timing of detecting a lens position and a diaphragm value cannot match an exposure timing in each of the areas. Namely, optimum AF control and AE control may fail to be performed.

Accordingly, AF control and AE control are optimized by individually specifying timings of detecting a lens position and a diaphragm value in the method described below.

<Example 1 of Specifying a Detection Timing>

Figure 9:
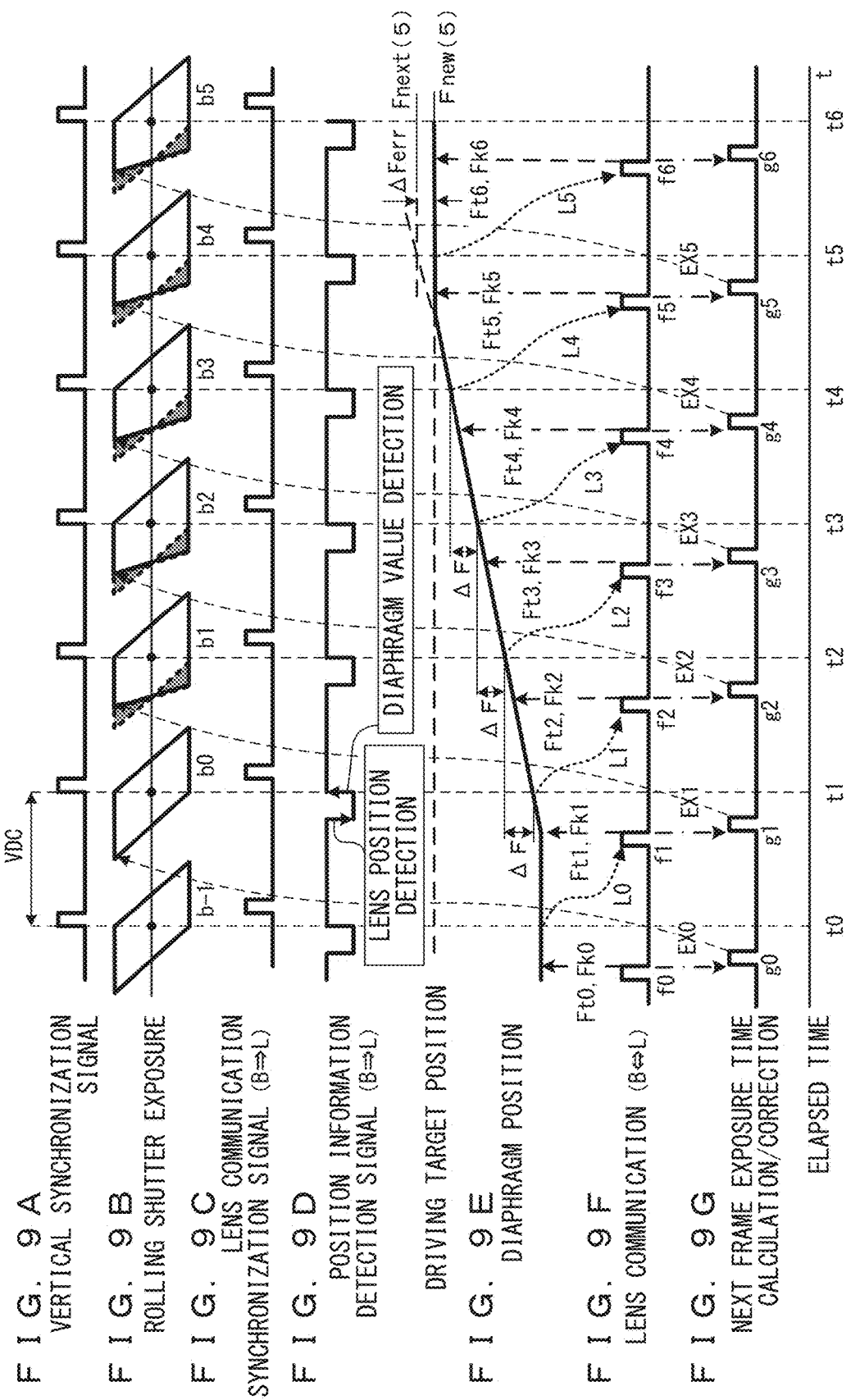
FIG. 9, including

FIG. 9, including FIGS. 9A-9G, is a timing chart illustrating Example 1 of specifying a detection timing. As illustrated in FIG. 9, a timing of "lens position detection" is instructed at a falling edge of a position information detection signal (FIG. 9D), and a timing of "diaphragm value detection" is instructed at a rising edge.

A "method for performing detection at a common timing according to Embodiment 1" and a "method in Example 1 of specifying a detection timing" may be switched according to an instruction from the BCPU 213 to the LCPU 310.

<Example 2 of Specifying a Detection Timing>

Figure 10:
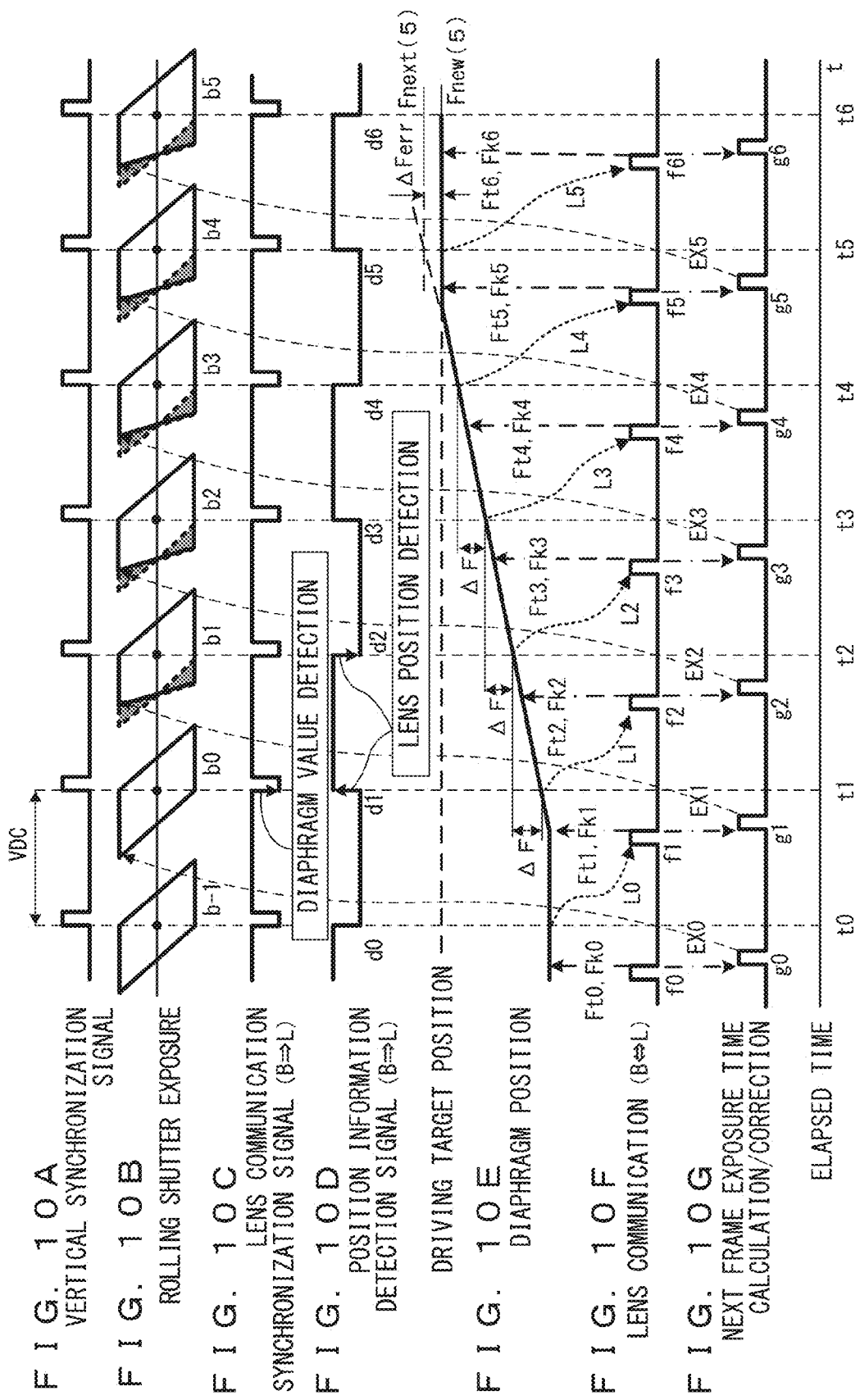
FIG. 10, including

FIG. 10, including FIGS. 10A-10G, is a timing chart illustrating Example 2 of specifying a detection timing. As illustrated in FIG. 10, a timing of "lens position detection" is instructed at both a rising edge and a falling edge of a position information detection signal (FIG. 10D), and a timing of "diaphragm value detection" is instructed at a falling edge of a lens communication synchronization signal (FIG. 10O).

<Example 3 of Specifying a Detection Timing>

Figure 11:
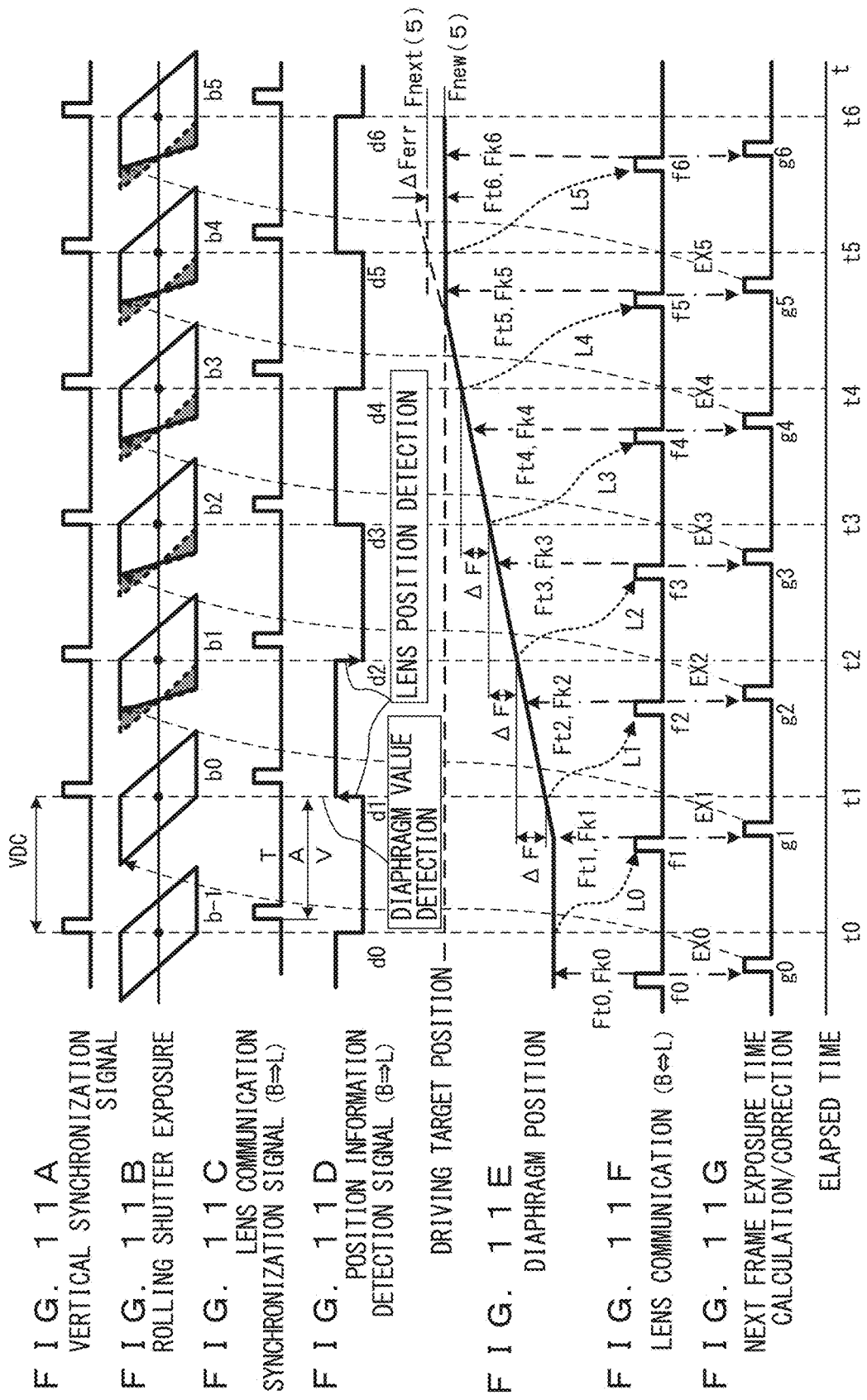
FIG. 11, including

FIG. 11, including FIGS. 11A-11G, is a timing chart illustrating Example 3 of specifying a detection timing. As illustrated in FIG. 11, a timing of "lens position detection" is instructed at both a rising edge and a falling edge of a position information detection signal (FIG. 11D), and a timing of "diaphragm value detection" is instructed when elapsed time $T_{AV}$ has elapsed from a rising edge of a lens communication synchronization signal (FIG. 11C). A base point of the elapsed time $T_{AV}$ may be a falling edge of the lens communication synchronization signal (FIG. 11C). In the respective examples above, methods for specifying detection timings of the lens position and the diaphragm value may be replaced with each other.

Embodiment 3

In Embodiment 3, countermeasures are taken against deviation of a change in a diaphragm value due to a zoom operation and tracking drive in addition to the processing according to Embodiment 1. In Embodiment 3, the lens unit 3 includes a zoom lens, and the lens unit 3 is assumed to control an aperture diameter of the diaphragm 304 in such a way that a diaphragm value does not change according to the zoom operation, namely, the lens unit 3 is assumed to be configured to be able to perform a so-called diaphragm tracking operation. A block diagram of an imaging apparatus and basic flowcharts according to Embodiment 3 are the same as those according to Embodiment 1. Therefore, common portions are omitted, and only different portions are described below.

Figure 12:
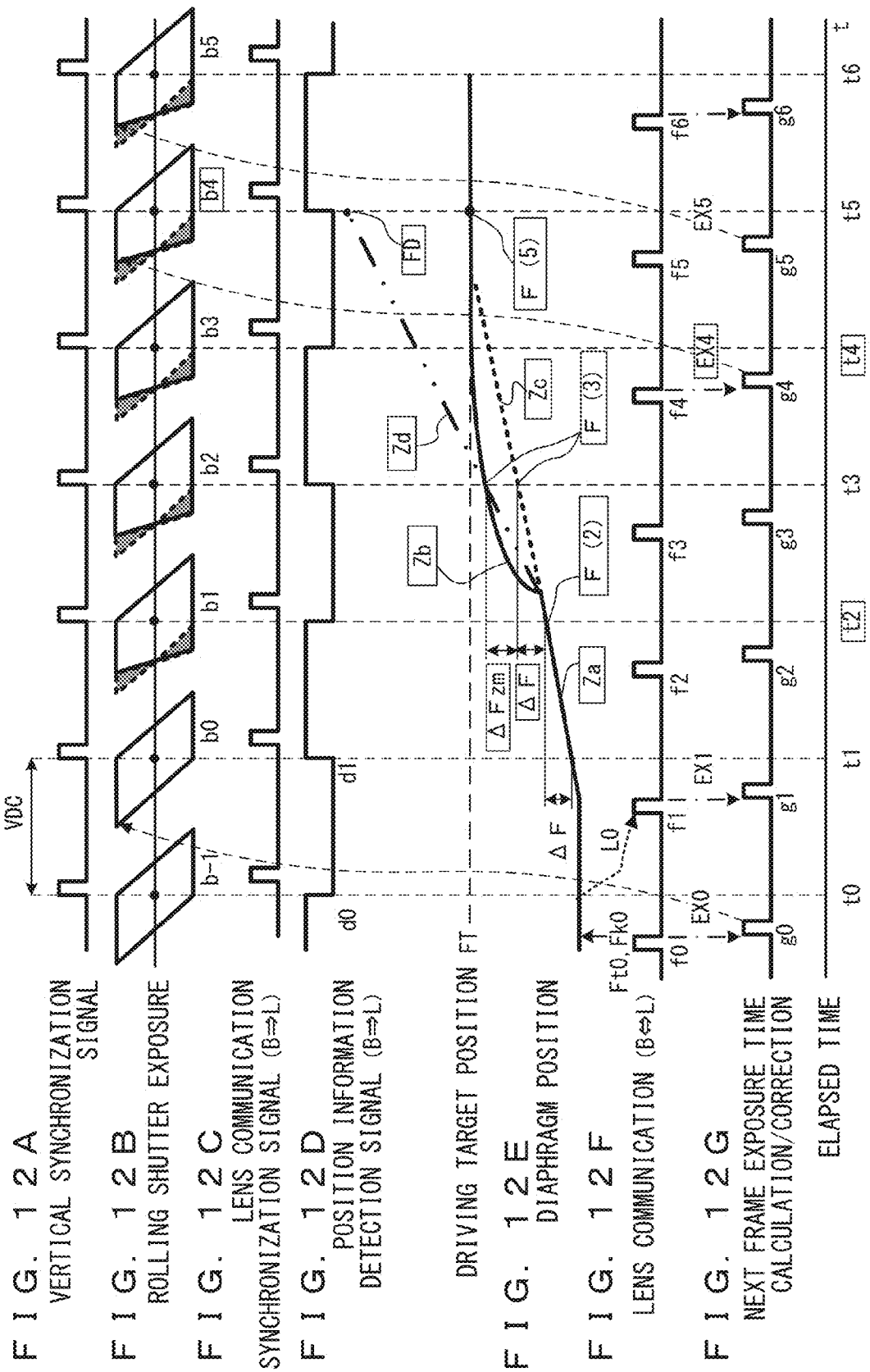
FIG. 12, including

FIG. 12, including FIGS. 12A-12G, is a timing chart explaining a procedure of exposure time calculation/correction processing in a case in which photographing is performed in a state in which the lens unit 3 that is configured to be able to perform diaphragm tracking operation is installed onto the body unit 2. FIG. 12 is partially changed from FIG. 5, and some reference numerals are omitted.

As illustrated in FIG. 12, when a zoom operation is performed at time t2, the LCPU 310 references a zoom position that is an output of a zoom position detecting unit (not illustrated) provided in the lens unit 3, and detects the zoom operation. In the lens storing unit 308, a diaphragm tracking characteristic 308b (not illustrated) indicating a relationship between a zoom position and a diaphragm aperture whereby a diaphragm value is constant is stored.

As a result of the zoom operation, a position of an optical system changes, and a diaphragm value also changed. Accordingly, the LCPU 310 makes the diaphragm driving unit 305 control an aperture diameter of the diaphragm 304 according to the zoom position so as to maintain a diaphragm value that has been set in exposure control. Namely, tracking drive to correct a diaphragm value that has changed due to the zoom operation is specified.

It is assumed that the zoom operation is performed and that a diaphragm tracking operation is performed immediately after time t2, as described above. Specifically, a diaphragm curve (FIG. 12E) changes, for example, as illustrated by a curve Zb (a solid line), with respect to a straight line Zc (a dashed line) in a case in which the tracking operation is not performed.

A difference between a diaphragm position F(2) at time t2 and a diaphragm position F(3) at time t3 is ΔF when the diaphragm tracking operation is not performed, but the difference is ΔF+ΔFzm when the diaphragm tracking operation is performed.

In the convention technology described above (Patent Document 2), a camera body predicts a diaphragm position at time t5 on the basis of the diaphragm position F(2) at time t2 and the diaphragm position F(3) at time t3. Accordingly, in the convention technology, a diaphragm curve after the diaphragm tracking operation is Zd (an alternate long and two short dashes line). A diaphragm position predicted at time t5 is a diaphragm position FD. An actually controlled diaphragm position at time t5 is a driving target position FT.

Accordingly, an exposure time calculated according to the predicted diaphragm position FD (EX4 in FIG. 12) greatly deviates from appropriate exposure, and rolling shutter exposure (b4 in FIG. 12) greatly deviates from the appropriate exposure. According to Embodiment 3, the problem above can be solved.

The LCPU 310 calculates an announcement value considering the diaphragm tracking operation (a diaphragm position F(5)), and transmits the announcement value to the BCPU 213 at a timing of lens communication after time t3. The BCPU 213 calculate exposure time (EX4 in FIG. 12) on the basis of the announcement value (the diaphragm position F(5)). Accordingly, an appropriate exposure time can be calculated on the basis of a diaphragm value considering a diaphragm tracking operation, and rolling shutter exposure (b4 in FIG. 12B) can be performed in the appropriate exposure.

Figure 13:
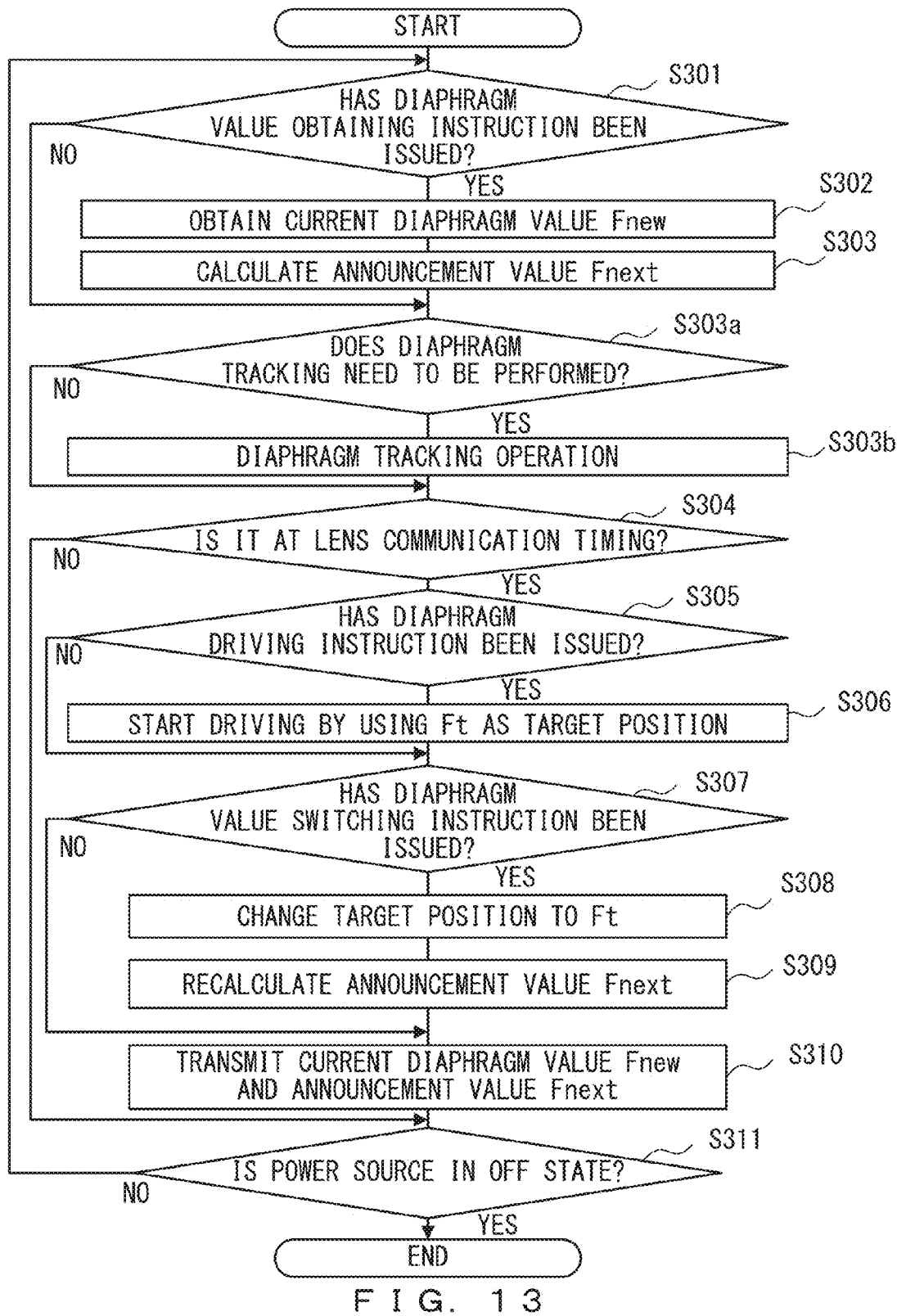
FIG. 13 is a flowchart explaining an operation of an LCPU according to Embodiment 3.

FIG. 13 is a flowchart explaining an operation of the LCPU 310 of the lens unit 3 that is configured to perform a diaphragm tacking operation. In the processing of FIG. 13, the same processes as those in FIG. 7 are denoted by the same reference numerals, and different portions are primarily described.

In FIG. 13, the processes of steps S301 to S303 are the same as those in FIG. 7. When a diaphragm value obtaining instruction is not issued in step S301, a diaphragm value $F_{next}$ of 2 frames after is calculated in step S301, and the processing moves on to step S303a. The LCPU 310 determines whether a diaphragm tracking operation needs to be performed (step S303a). Here, the LCPU 310 references a zoom position that is an output of a zoom position detecting unit, and detects whether a zoom operation has been performed.

When the LCPU 310 determines that a diaphragm tracking operation needs to be performed (step S303a; Yes), the LCPU 310 performs the diaphragm tracking operation according to the diaphragm tracking characteristic 308b stored in the lens storing unit 308 (step S303b). The diaphragm tracking operation is performed in step S303b in processing of repeatedly performing the processes of step S301 to S310 in FIG. 13 during a zoom operation, and the diaphragm tracking operation is performed following the continuous zoom operation.

When the LCPU 310 determines that a diaphragm tracking operation does not need to be performed (step S303a; No), the process of step S303b is skipped, and the processing moves on to step S304. This procedure is performed, for example, in a case in which a zoom operation is not performed, or in a case in which a change in a diaphragm value due to the zoom operation is within an allowable range of an exposure error. The operation after step S304 is the same as the operation in FIG. 7, and the description thereof is omitted.

As described above, according to Embodiment 3, even when a live view is displayed or a moving image is photographed in a state in which a lens unit that performs a diaphragm tracking operation according to a zoom operation is installed as the lens unit 3, unevenness of brightness of an image in a live view display or between adjacent frames of a moving image that is generated by misidentifying a change in an exposure amount due to the diaphragm tracking operation to be a change in subject luminance and changing exposure conditions can be suppressed.

As described in the DESCRIPTION OF THE RELATED ART, a proposal in Patent Document 2, for example, does not correspond to a case in which a lens in which a diaphragm value does not change at a constant speed is installed, or a case in which a diaphragm tracking operation linked with driving of a focus lens or a zoom lens is performed. When the lens in which a diaphragm value does not change at a constant speed is installed, or when the diaphragm tracking operation is performed, a predicted diaphragm value has a value different from an actual diaphragm value, and consequently unevenness of brightness in an image cannot be suppressed appropriately, or exposure deviation can occur and a photographed video can flicker.

According to the embodiments above, an imaging apparatus can be provided that can solve the problem above, and that can photograph a video having a high quality in which there is no unevenness of brightness or flicker due to deviation of a diaphragm value in exposure conditions settings.

For macro lenses, a lens unit is known that performs a diaphragm tracking operation by performing a focus operation instead of a zoom operation. In a case in which this type of lens unit is installed, when a user performs a manual focus operation so as to perform a diaphragm tracking operation, similar countermeasures are taken against deviation of a change in a diaphragm value.

In the embodiments above, operation flows in the claims, the specification, and the drawings have been described by using the term "first", "then", or the like for convenience, but this does not mean that it is mandatory to perform the operation flows in the order described above.

The embodiments above have been described by using a digital single-lens reflex camera as an imaging apparatus, but the present invention can be applied, for example, to a digital camera in which the lens unit 3 and the body unit 2 are integrally formed, a digital video camera, and an electronic apparatus such as a mobile telephone or a tablet-type portable device having a photographing function.

In the embodiments above, description has been given that the BCPU 213 and the LCPU 310 are implemented by software processing of a CPU that has read a control program, but all or part of the BCPU 213 and the LCPU 310 may be configured to be implemented by hardware.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OR NUMERALS

1 Imaging apparatus
2 Body unit
3 Lens unit

201 Shutter
202 Shutter driving unit
203 Image sensor
204 Image sensor driving unit
205 Signal processing unit
206 Light emitting unit
207 Synchronization signal generating unit
208 Body communicating unit
209 Operation input unit
210 Display unit
211 Touch panel
212 Storing unit
213 BCPU
213a Image processing unit
213b Face detecting unit
213c Target value calculating unit
213d Exposure control unit
213e Exposure time calculating unit
213f Exposure time correcting unit
213g Gain setting unit
213h Photographing control unit
301 Optical system
302 Lens driving unit
303 Lens position detecting unit
304 Diaphragm
305 Diaphragm driving unit
306 Diaphragm value detecting unit
307 Lens operating unit
308 Lens storing unit
308a Driving control table data
309 Lens communicating unit
310 LCPU

What is claimed is:

1. An imaging apparatus comprising:
a lens unit that includes an optical system including a variable diaphragm; and
a body unit installed with the lens unit, the body unit including an image sensor that receives light condensed via the lens unit and performs photoelectric conversion, wherein
the lens unit includes:
a diaphragm driving unit that drives the variable diaphragm;
a diaphragm value detecting unit that detects a diaphragm value of the variable diaphragm; and
a lens control unit that controls the diaphragm driving unit,
when the diaphragm value of the variable diaphragm is changed, the lens control unit calculates an announcement value indicating a diaphragm value when a prescribed time period has passed since a detection time of a current diaphragm value of the variable diaphragm, the current diaphragm value being detected by the diaphragm value detecting unit, and transmits the announcement value to the body unit, and
the body unit includes:
an exposure control unit that controls exposure of the image sensor on the basis of the announcement value obtained from the lens unit.

2. The imaging apparatus according to claim 1, wherein
the lens unit includes a storing unit that stores a change characteristic of the diaphragm value of the variable diaphragm according to a driving amount of the diaphragm driving unit, and
the lens control unit calculates the announcement value on the basis of the change characteristic.

3. The imaging apparatus according to claim 1, wherein
the body unit calculates a target value of the diaphragm that corresponds to a change in subject luminance, and transits the target value to the lens unit,
the lens control unit calculates the announcement value on the basis of the target value received from the body unit and the current diaphragm value, and transmits the current diaphragm value and the announcement value to the body unit, and
the exposure control unit controls the exposure of the image sensor on the basis of the current diaphragm value and the announcement value.

4. The imaging apparatus according to claim 1, wherein
the exposure control unit calculates exposure time of the image sensor on the basis of subject luminance information obtained from image data generated by the image sensor, and controls the exposure on each horizontal line of the image sensor on the basis of the calculated exposure time and a plurality of diaphragm values including the announcement value obtained from the lens unit.

5. An imaging apparatus comprising:
a lens unit that includes an optical system including a variable diaphragm, the lens unit condensing light from a prescribed visual field area; and
a body unit installed with the lens unit, the body unit including an image sensor that receives the light condensed via the lens unit and performs photoelectric conversion, wherein
the lens unit includes:
a diaphragm driving unit that drives the variable diaphragm;
a diaphragm value detecting unit that detects a diaphragm value of the variable diaphragm; and
a lens control unit that controls the diaphragm driving unit, and that, when the diaphragm value of the variable diaphragm is changed, calculates an announcement value indicating a diaphragm value when a prescribed time period has passed since a detection time of a current diaphragm value of the variable diaphragm, the current diaphragm value being detected by the diaphragm value detecting unit,
the body unit includes:
an image sensor in which a plurality of pixels are arranged two-dimensionally in vertical and horizontal directions, the plurality of pixels receiving light condensed via the lens unit and performing photoelectric conversion, the image sensor sequentially reading electric signals converted by the plurality of pixels at different timings on each line in the horizontal direction on which a plurality of images are arranged, and continuously generating image data; and
an exposure time correcting unit that corrects exposure time of the image sensor on each of the lines in the horizontal direction, and
the exposure time correcting unit calculates a temporal change amount of the diaphragm value on the basis of a plurality of diaphragm values including the announcement value obtained from the lens unit, and corrects the exposure time of the image sensor in accordance with the temporal change amount of the diaphragm value on each of the lines in the horizontal direction.

6. The imaging apparatus according to claim 5, wherein the body unit further includes:
- a gain setting unit that sets a gain of the image data on the basis of the announcement value; and
- an image processing unit that adjusts the image data by using the set gain.

7. An imaging method performed by an imaging apparatus including:
- a lens unit that includes an optical system including a variable diaphragm, a diaphragm driving unit that drives the variable diaphragm, and a diaphragm value detecting unit that detects a diaphragm value of the variable diaphragm; and
- a body unit installed with the lens unit, the body unit including an image sensor that receives light condensed via the lens unit and continuously generates image data, the imaging method comprising:
- calculating, by the body unit, a target value of the diaphragm value of the variable diaphragm to be changed according to a change in subject luminance;
- transmitting the calculated target value from the body unit to the lens unit;
- receiving, by the lens unit, the target value;
- detecting, by the diaphragm value detecting unit, a current diaphragm value of the variable diaphragm;
- calculating, by the lens unit, an announcement value indicating a diaphragm value predicted when a prescribed time period has passed since a diaphragm driving unit starts to drive the diaphragm value to the target value on the basis of a change characteristic data of the diaphragm value due to driving of the diaphragm driving unit;
- transmitting the calculated announcement value from the lens unit to the body unit;
- receiving, by the body unit, the announcement value; and
- calculating, by the body unit, a temporal change amount of the diaphragm value driven to the target value on the basis of the announcement value obtained from the lens unit, and correcting exposure time of the image sensor according to the temporal change amount.

8. A computer-readable non-transitory storage medium having a program for causing a computer of an imaging apparatus to perform an imaging method, the imaging apparatus including: a lens unit that includes an optical system including a variable diaphragm, a diaphragm driving unit that drives the variable diaphragm, and a diaphragm value detecting unit that detects a diaphragm value of the variable diaphragm; and a body unit installed with the lens unit, the body unit including an image sensor that receives light condensed via the lens unit and continuously generates image data, the imaging method comprising:
- calculating, by the body unit, a target value of the diaphragm value of the variable diaphragm to be changed according to a change in subject luminance;
- transmitting the calculated target value from the body unit to the lens unit;
- receiving, by the lens unit, the target value;
- detecting, by the diaphragm value detecting unit, a current diaphragm value of the variable diaphragm;
- calculating, by the lens unit, an announcement value indicating the diaphragm value predicted when a prescribed time period has passed since the diaphragm driving unit starts to drive the diaphragm value to the target value on the basis of a change characteristic data of the diaphragm value due to driving of the diaphragm driving unit;
- transmitting the calculated announcement value from the lens unit to the body unit;
- receiving, by the body unit, the announcement value; and
- calculating, by the body unit, a temporal change amount of the diaphragm value driven to the target value on the basis of the announcement value obtained from the lens unit, and correcting exposure time of the image sensor according to the temporal change amount.

* * * * *